United States Patent
Shinoda

(10) Patent No.: US 7,613,099 B2
(45) Date of Patent: Nov. 3, 2009

(54) SOLID IMMERSION LENS, CONDENSING LENS, OPTICAL PICKUP DEVICE, OPTICAL RECORDING AND REPRODUCING APPARATUS AND METHOD OF FORMING SOLID IMMERSION LENS

(75) Inventor: Masataka Shinoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 11/073,608

(22) Filed: Mar. 8, 2005

(65) Prior Publication Data

US 2005/0232120 A1  Oct. 20, 2005

(30) Foreign Application Priority Data

Mar. 15, 2004 (JP) ............................ 2004-073162
Jan. 26, 2005 (JP) ............................ 2005-018662

(51) Int. Cl.
*G11B 7/135* (2006.01)
*G11B 7/22* (2006.01)

(52) U.S. Cl. ............... 369/112.24; 369/300; 369/44.32; 369/13.33; 359/656; 359/708

(58) Field of Classification Search ............... 369/13.33, 369/112.08, 112.13, 112.2, 112.23, 112.26, 369/44.14, 44.23; 359/719
See application file for complete search history.

(56) References Cited

U.S. PATENT DOCUMENTS

| | | | | |
|---|---|---|---|---|
| 5,939,709 A | * | 8/1999 | Ghislain et al. | 250/216 |
| 6,181,478 B1 | * | 1/2001 | Mandella | 359/642 |
| 6,442,110 B1 | * | 8/2002 | Yamamoto et al. | 369/44.23 |
| 6,594,086 B1 | * | 7/2003 | Pakdaman et al. | 359/656 |
| 2003/0184832 A1 | * | 10/2003 | Imanishi | 359/204 |
| 2004/0057122 A1 | * | 3/2004 | Hori | 359/642 |
| 2004/0202055 A1 | * | 10/2004 | Knight et al. | 369/13.33 |
| 2004/0240074 A1 | * | 12/2004 | Pakdaman et al. | 359/656 |
| 2006/0256695 A1 | * | 11/2006 | Saito et al. | 369/112.01 |
| 2007/0091743 A1 | * | 4/2007 | Lee et al. | 369/44.32 |
| 2007/0183057 A1 | * | 8/2007 | Terada et al. | 359/656 |

* cited by examiner

*Primary Examiner*—Wayne R Young
*Assistant Examiner*—Dionne H Pendleton
(74) *Attorney, Agent, or Firm*—Oblon, Spivak, McClelland, Maier & Neustadt, L.L.P.

(57) ABSTRACT

A solid immersion lens has an inclined portion formed on at least a part thereof from the tip end portion of the objective side to a spherical portion and an inclination angle θ is expressed as θ≧θi where θi represents the angle of incidence of light incident on the solid immersion lens. There are provided a solid immersion lens capable of increasing a tilt margin between a lens and an optical recording medium and so on and which can decrease a diameter of a lens and a method for forming a solid immersion lens.

24 Claims, 32 Drawing Sheets

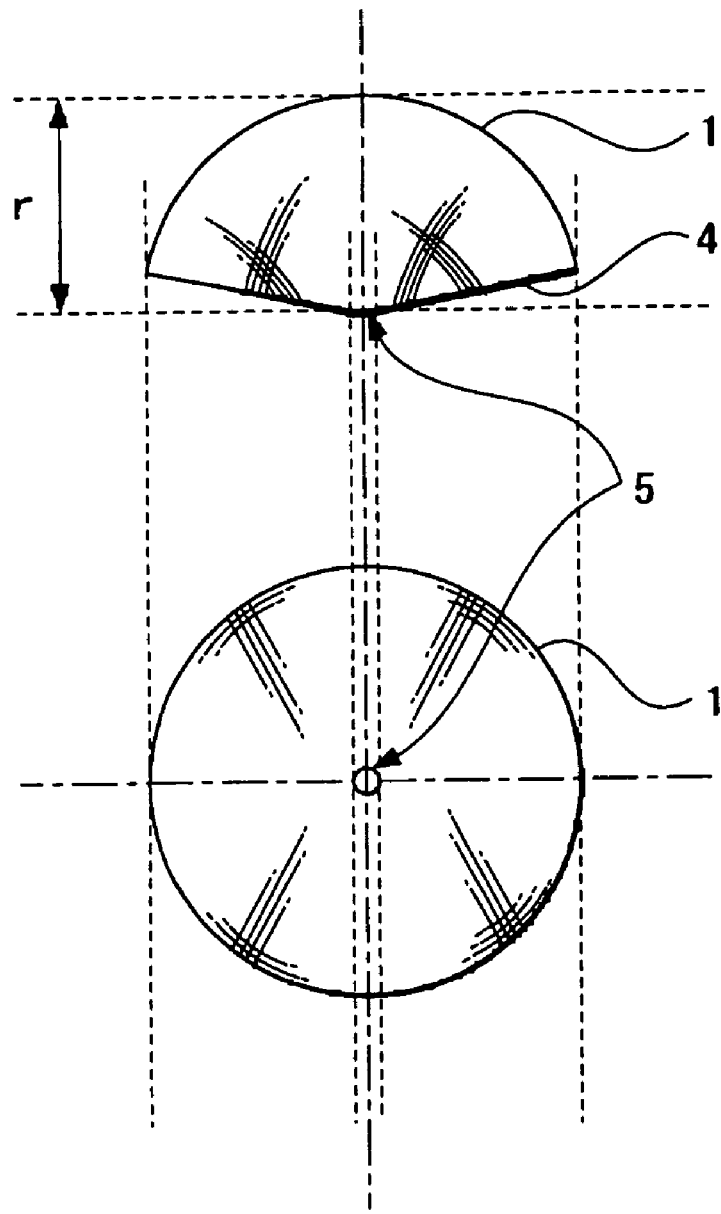

FIG. 9A
FIG. 9B
FIG. 10
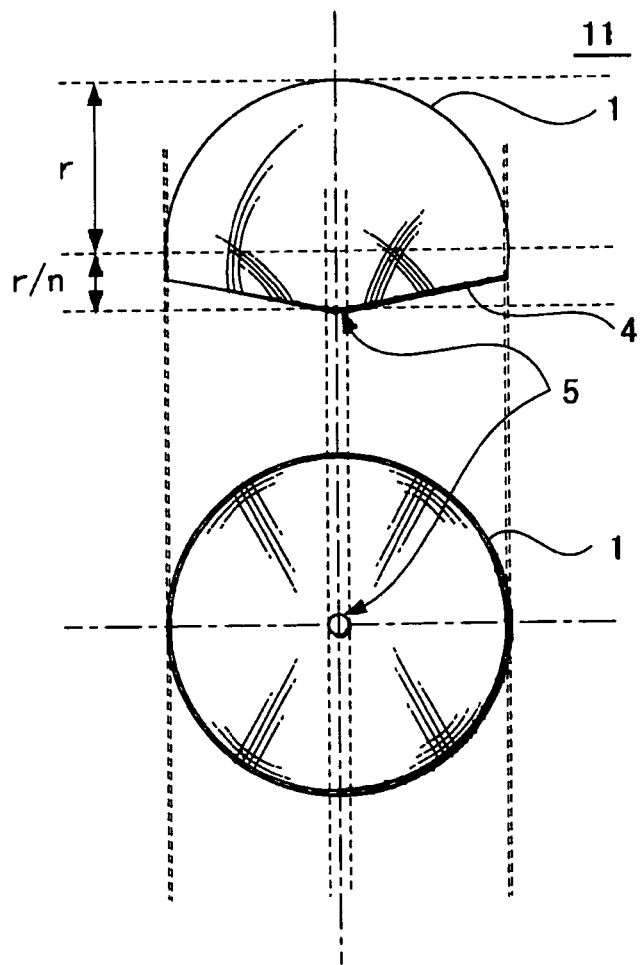
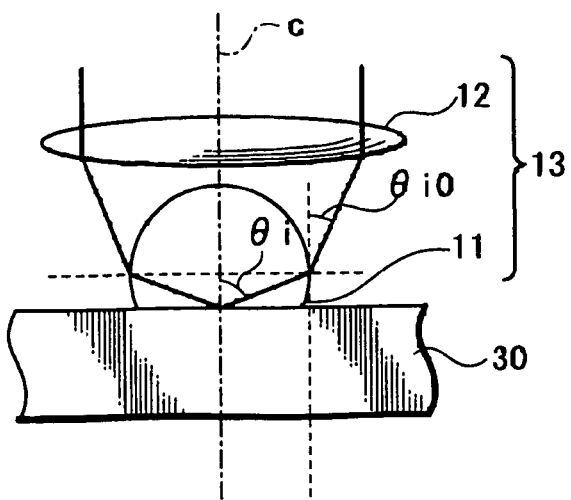

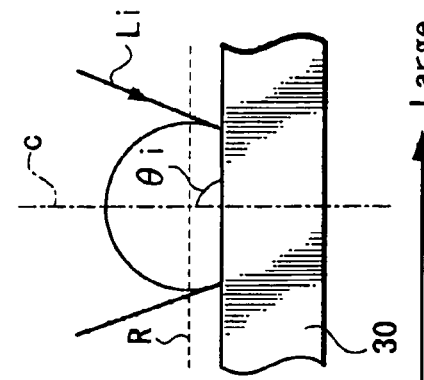
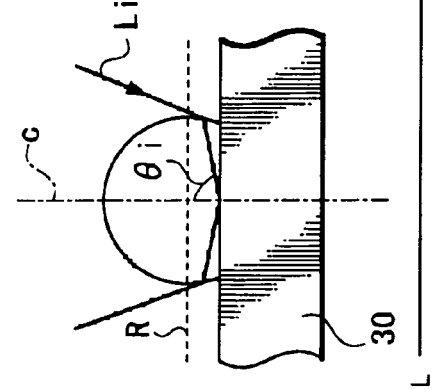
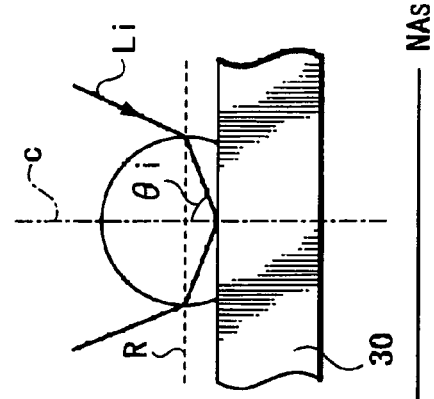
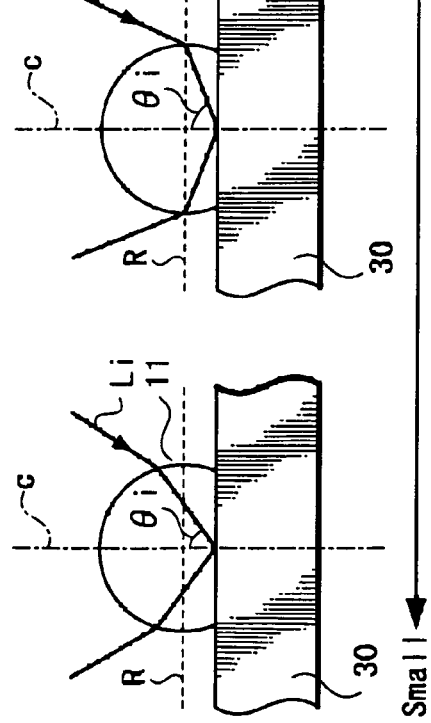

SOLID IMMERSION LENS, CONDENSING LENS, OPTICAL PICKUP DEVICE, OPTICAL RECORDING AND REPRODUCING APPARATUS AND METHOD OF FORMING SOLID IMMERSION LENS

CROSS REFERENCES TO RELATED APPLICATIONS

The present invention contains subject matter related to Japanese Patent Application JP 2004-073162 and JP 2005-018662 filed in the Japanese Patent Office on Mar. 15, 2004 and Jan. 26, 2005 respectively, the entire contents of which being incorporated herein by reference.

BACKGROUND OF THE INVENTION

1. Field of the Invention

The present invention generally relates to a solid immersion lens (SIL), a condensing lens using such solid immersion lens, an optical pickup device, an optical recording and reproducing apparatus (or a magneto-optical recording and reproducing apparatus) and a method for forming a solid immersion lens. More particularly, this invention relates to a solid immersion lens, a condensing lens, an optical pickup device, an optical recording and reproducing apparatus and a method for forming a solid immersion lens suitable for use with a so-called near-field optical recording and reproducing system in which information is recorded on and reproduced from an optical recording medium (or a magneto-optical recording medium) by using a condensing lens of which numerical aperture is increased by a material having a large refractive index of an optical lens.

2. Description of the Related Art

Optical recording mediums (including a magneto-optical recording medium) represented by a compact disc (CD), a mini-disc (MD) and a digital versatile disc (DVD) are widely used as storage mediums for storing music information, video information, data, programs and so forth. However, in order to provide high sound quality, high picture quality, longer time recording and playback and a larger storage capacity for music information, video information, data, programs and the like, an optical recording medium having a larger storage capacity and an optical recording and reproducing apparatus (including a magneto-optical recording and reproducing apparatus) capable of recording and reproducing such optical recording medium have been desired so far.

In order to meet such requirements, in the optical recording and reproducing apparatus, a wavelength of light emitted from a light source, for example, a semiconductor laser has been shortened, a numerical aperture of a condensing lens has been increased and a diameter of a beam spot of light focused on an optical recording medium through the condensing lens has been reduced.

For example, with respect to a semiconductor laser, a GaN semiconductor laser of which oscillation wavelength has been reduced from 635 nm, which is an oscillation wavelength of a related-art red laser, to 400 nm band has been put into practice and thereby a diameter of a spot of light has been reduced more. Also, with respect to a semiconductor laser with a shorter oscillation wavelength, a far-ultraviolet solid laser, manufactured by SONY CORPORATION under the trade name of UW-1010, capable of continuously emitting light of a single wavelength of 266 nm and the like are now commercially available on the market and hence a diameter of a beam spot of light has been reduced more. In addition to the above semiconductor lasers, a laser capable of emitting laser light with a wavelength (266 nm band) twice that of an Nd:YAG laser, a laser capable of emitting laser light with a wavelength (202 nm band) twice that of a GaN laser and so on are now under study and development.

A so-called near-field optical recording and reproducing system are now under consideration, in which a condensing lens with a numerical aperture larger than 1, for example, can be realized by using an optical lens such as a solid immersion lens (SIL) with a large numerical aperture and in which the objective surface of this condensing lens can be made close to the optical recording medium with a distance of approximately one-tenth of a wavelength of its light source to thereby record and reproduce information (see cited patent reference 1, for example).

In this near-field optical recording and reproducing system, it is important to hold a distance between the optical recording medium and the condensing lens in an optical contact state with high accuracy. Also, since a diameter of a beam spot of focused light introduced into the condensing lens after it has been emitted from the light source is reduced and a distance between the optical recording medium and the condensing lens is extremely decreased to become less than about several tens of nanometers, an inclination margin between the optical recording medium and the condensing lens, that is, so-called tilt margin becomes very small, and it is unavoidable that the condensing lens is much restricted from a shape standpoint.

FIGS. 1A and 1B of the accompanying drawings are respectively a schematic side view and a schematic plan view showing an arrangement of an example of a solid immersion lens according to the related art. As shown in FIG. 1A, a solid immersion lens 1 is formed as a hemispherical shape of a hyper-hemispherical shape (hyper-hemispherical shape in the illustrated example. A thickness extending along the optical axis is r when the solid immersion lens 1 is formed as the hemispherical shape, and a thickness extending along the optical axis is r (1+1/n) when the solid immersion lens 1 is formed as the hyper-spherical shape. An objective surface 9 is shaped as a flat surface, for example.

Such solid immersion lens 1 and the optical lens can be sequentially disposed from the objective side of the optical recoding medium to thereby construct a near-field condensing lens.

When the condensing lens having the above arrangement is applied to an optical recording and reproducing apparatus, for example, the condensing lens is mounted on an optical pickup device having a biaxial actuator and a distance between the optical recording medium and the condensing lens is maintained in the optical contact state. When the above condensing lens is applied to a magneto-optical recording and reproducing apparatus, a magnetic head device for use in magnetic recording and reproducing is assembled into an optical pickup device and a distance between the optical recording medium and the condensing lens is similarly maintained in the optical contact state.

Also, with respect to the shape of the solid immersion lens, a shape in which an objective surface of a hemispherical or hyper-hemispherical lens is processed as a circular cone shape, a shape in which a magnetic coil is provided around the remaining central portion of the objective surface and so forth have been proposed (see cited patent reference 2, for example).

Cited patent reference 1: Official gazette of Japanese laid-open patent application No. 5-189796

Cited patent reference 2: Official gazette of Japanese laid-open patent application No. 2003-161801

In the above-mentioned near-field optical recording and reproducing system, in order to stably control the condensing lens which is moved in the focusing direction and/or tracking direction of the optical recording medium, it is requested that the lens should be reduced in diameter and that it should be miniaturized. Further, in order to stably record and reproduce the optical recording medium, a tilt margin between the optical recording medium and the condensing lens should be increased.

For example, if the objective surface of the solid immersion lens is formed as a circular cone shape and the tip end portion of its circular cone is processed as a flat surface, then when a distance between the solid immersion lens and the condensing lens is selected to be a very short distance as short as approximately several tens of nanometers, it is possible to maintain a certain amount of the tilt margin between the lens and the optical recording medium.

However, when the solid immersion lens in which the objective side is formed as the circular cone shape is formed, depending upon the inclination angle of the circular cone shape, it is difficult to obtain a solid immersion lens with a large numerical aperture or there is a risk that a holding member for holding the lens will not be bonded to the lens satisfactorily.

Also, when the objective side is formed as the circular cone shape as described above, according to the present process technology, there is a limit in reducing a diameter of a lens.

This defect will be described below. As an ordinary method for forming a solid immersion lens, there is enumerated a method in which a high refractive index material of a cubic shape, for example, is processed as a so-called ball lens of substantially a spherical shape, this ball lens is further processed as a hemispherical or hyper-hemispherical lens and its objective surface of the hemispherical or hyper-hemispherical lens is processed as a circular cone shape.

When a solid immersion lens of a hyper-hemispherical shape with a diameter of approximately 1 mm, for example, is formed by a mechanical polishing or a cutting means according to the above-mentioned method, it is extremely difficult to process its objective surface, that is, the top portion of the circular cone shape as a flat surface with a radius of less than about several tens of microns with high accuracy. While the objective surface with a diameter of about 50 μm can be formed at present, it is difficult to form such objective surface with excellent productivity while the shape of the objective surface can be prevented from being fluctuated.

Further, when a very small flat surface is formed on a part of the objective surface of the lens processed as the circular cone shale by a microminiaturizing process means based on a semiconductor process technology such as an RIE (reactive ion etching), a complex process for masking the circular cone portion by using a photolithography becomes necessary and as a result, a problem arises, in which a process time is extended.

Further, also in this case, if the radius of curvature of the solid immersion lens is as large as about several millimeters, then a problem arises, in which the solid immersion lens is restricted by a tilt margin between the end portion of the objective surface and the optical recording medium.

Further, it is requested that the diameters of respective lenses of the optical system including the solid immersion lens should be further reduced in order to alleviate the load of the weight of the biaxial actuator for mounting the lens thereon to thereby improve servo characteristics such as focusing characteristics, tracking characteristics and reduction of a seek time. In particular, since the solid immersion lens is frequently made of a relatively expensive material that can realize a high refractive index, it is desired that the diameter of the solid immersion lens should be reduced as much as possible.

However, when the radius of curvature of the solid immersion lens is made extremely small, for example, the radius of curvature is selected to be less than the radius of 0.5 mm, for example, a problem arises, in which it becomes more difficult to process, in particular, the tip end portion by the above-mentioned forming method.

SUMMARY OF THE INVENTION

In view of the aforesaid aspect, it is an object of the present invention to provide a solid immersion lens of a shape in which a tilt margin between a lens and an object such as an optical recording medium can be maintained sufficiently and in which a diameter of a lens can be reduced and a method of forming such solid immersion lens.

It is another object of the present invention to provide a condensing lens using a solid immersion lens, an optical pickup device and an optical recording and reproducing apparatus in which a tilt margin between a lens and an optical recording medium can be increased so that an accuracy margin of assembly of the condensing lens, the optical pickup device and the optical recording and reproducing apparatus can be increased.

According to an aspect of the present invention, there is provided a solid immersion lens comprising an inclined portion formed on at least a part of a tip end portion of the objective side, wherein an inclination angle θ from the optical axis of said inclined portion is expressed as:

$$\theta \geq \theta i$$

where θi represents an angle of incidence of incident light.

According to other aspect of the present invention, in the above-mentioned solid immersion lens, the inclined portion has a convex portion formed on its tip end portion so as to protrude toward the objective side.

According to a further aspect of the present invention, in the solid immersion lens having the above-mentioned arrangement, the convex portion is shaped so as to satisfy the following relationships expressed as:

$$\tan^{-1}(h/y) < 90° - \theta i \quad (1)$$

$$\tan^{-1}((d+h)/z) \geq 0.10° \quad (2)$$

$$\tan^{-1}(d/y) \geq 0.10° \quad (3)$$

where h represents the height protruding toward the objective side, y represents the length from said optical axis to the edge portion of said convex-like portion, z represents the length from said optical axis to the edge portion of the objective side of said inclined portion and d represents a space between said solid immersion lens and the objective.

According to yet a further aspect of the present invention, in the solid immersion lens having the above-mentioned respective arrangements, the solid immersion lens has a spherical portion shaped like a hemisphere on the opposite side of the objective side and the tip end face of the convex portion is shaped so as to approximately circumscribe a sphere having a diameter of nearly r where r represents the radius of curvature of the spherical portion or the solid immersion lens has a spherical portion shaped like a hyper-hemisphere on the opposite side of the objective side and the tip end face of the tip end portion is shaped so as to approximately circumscribe a sphere having a radius of nearly r/n where r represents the radius of curvature of the spherical portion and n represents the refractive index.

Also, a condensing lens according to the present invention is characterized in that the condensing lens is composed of the solid immersion lens having the above-mentioned arrangement of the present invention and an optical lens with its optical axis coincident with that of the solid immersion lens and which is located on the opposite side of the objective side.

Further, an optical pickup device according to the present invention is characterized in that this optical pickup device is composed of at least the solid immersion lens having the above-mentioned arrangement of the present invention, the optical lens with its optical axis coincident with that of the solid immersion lens and a light source, wherein the condensing lens composed of the solid immersion lens and the optical lens focuses light emitted from the light source to form a spot of light beam.

Further, an optical recording and reproducing apparatus according to the present invention comprises an optical pickup device including the condensing lens using the solid immersion lens having the above-mentioned arrangement of the present invention and the optical recording and reproducing apparatus of the present invention is characterized by control drive means for moving the condensing lens in the focusing direction and/or tracking direction of the optical recording medium.

Furthermore, a method for forming a solid immersion lens according to the present invention comprises a process for forming an inclined portion on a lens material body, a process for forming a convex portion on the objective side of the lens material body and a process for forming the objective surface of the convex portion.

Also, according to the method for forming the solid immersion lens according to the present invention, in the above-mentioned forming method, the convex portion of the solid immersion lens is processed as a shape which can satisfy relationships of the above-described equations (1) to (3).

Further, a method for forming a solid immersion lens according to the present invention, in the above-mentioned respective forming methods, the solid immersion lens has a spherical portion shaped like a hemisphere on the opposite side of the objective side and the tip end face of the convex portion is shaped so as to approximately circumscribe a sphere having a diameter of nearly r where r represents the radius of curvature of the spherical portion or the solid immersion lens has a spherical portion shaped like a hyper-hemisphere on the opposite side of the objective side and the tip end face of the tip end portion is shaped so as to approximately circumscribe a sphere having a radius of nearly r/n where r represents the radius of curvature of the spherical portion and n represents the refractive index.

Furthermore, according to a method for forming a solid immersion lens of the present invention, in the above-mentioned respective forming methods, the tip end portion of the convex portion of the solid immersion lens is processed by a focus ion beam process method.

In the above-mentioned solid immersion lens according to the present invention, the inclined portion is formed at least on a part thereof from the tip end portion of the objective side to the spherical portion and the inclination angle $\theta$ from the optical axis of the inclined portion is selected to satisfy:

$$\theta \geq \theta i$$

where $\theta i$ represents the angle of incidence of light introduced into the solid immersion lens. Hence, the incident light can be reliably focused on the tip end portion and a bonding area of the solid immersion lens to the holding member can be maintained and thus the solid immersion lens can be held by the holding member more stably.

Also, in the above-mentioned solid immersion lens, since the convex portion is provided on the tip end portion of the inclined portion so as to protrude in the objective side, the objective surface of the convex portion can be formed as the very small area and the tilt margin between the solid immersion lens and the optical recording medium and the like can be increased as compared with the related art. Further, since a processed volume obtained when this convex portion is formed becomes small as compared with a processed volume obtained when a circular cone shape is formed, when only the convex portion is processed and formed by a suitable method such as a semiconductor process technology, it becomes possible to form the objective surface of small area as compared with the case in which only the convex portion is processed and formed by only the related-art mechanical process. Thus, it becomes possible to reduce the diameter of the solid immersion lens itself.

Also, in the solid immersion lens according to the present invention, when the solid immersion lens is formed so as to satisfy the above-described equations (1) to (3), incident light can be focused on the objective surface while the incident light of angle of incidence to obtain the maximum numerical aperture can be reliably prevented from being interrupted. Also, the tilt margin can be reliably increased to become larger than 0.10° and the tilt margin between the objective surface and the optical recording medium can be increased as compared with the related-art solid immersion lens. In addition, it becomes possible to easily provide the solid immersion lens by which the maximum numerical aperture can be obtained.

Further, in the solid immersion lens according to the present invention, when its tip end portion is formed as the shape which substantially circumscribes the sphere with the diameter of approximately r if the spherical portion is the hemispherical portion or when its tip end portion is formed as the shape which substantially circumscribes the sphere with the radius of approximately r/n if the spherical portion is the hyper-hemispherical portion, the solid immersion lens can have the permissible range relative to the displacement of the optical axis of the incident light, and both of the tilt margin between this solid immersion lens and the object such as the optical recording medium and the assembly accuracy margin between this solid immersion lens and other optical lens can be increased. Thus, it is possible to easily obtain the solid immersion lens with the large numerical aperture.

Then, according to the condensing lens using the solid immersion lens having the above-mentioned arrangement of the present invention, since the tilt margin between the solid immersion lens and the optical recording medium and the like can be increased as compared with the related art, the assembly accuracy of the condensing lens relative to the optical lens can be increased, and hence it becomes possible to assemble the condensing lens with the large numerical aperture more easily as compared with the related art.

Also, in the optical pickup device and the optical recording and reproducing apparatus constructed by using this condensing lens, the tilt margin between the solid immersion lens and the optical recording medium can be increased, incident light to obtain the maximum numerical aperture of the lens can be focused reliably and its assembly accuracy margin can be increased as compared with the related art.

Then, since the diameter of the solid immersion lens also can be reduced, in the optical pickup device and the optical recording and reproducing apparatus constructed by using this condensing lens, it becomes possible to stably control the condensing lens which is moved in the focusing direction of the optical recording medium or in the tracking direction of the optical recording medium. Furthermore, it becomes possible to improve servo characteristics such as focusing servo, tracking servo and the seek time.

Also, according to the method for forming the solid immersion lens of the present invention, since this forming method comprises at least the process for forming the inclined portion on the lens material body, the process for forming the convex portion on the objective side of the lens material body and the process for processing the objective surface of the convex portion, when the inclined portion is formed by the machine process and the convex portion is formed by a suitable method such as the semiconductor process technology, the objective surface can be formed as the very small area as compared with the related art and hence the process time and process volume of this objective surface can be decreased.

Therefore, according to the solid immersion lens forming method of the present invention, it becomes possible to easily obtain the condensing lens in which the tilt margin between the objective surface and the optical recording medium can be increased and which has the large numerical aperture.

Further, in the solid immersion lens forming method of the present invention, when the convex portion of the solid immersion lens is processed as the shape which can satisfy the above-described equations (1) to (3), as described above, it is possible to form the solid immersion lens in which the tilt margin between the objective surface and the optical recording medium can be increased as compared with the related-art solid immersion lens and which can obtain the maximum numerical aperture.

Also, in the solid immersion lens forming method of the present invention, when the tip end portion of the convex portion is formed as the shape which substantially circumscribes the sphere with the diameter of approximately r if the spherical portion is the hemispherical portion or when it is formed as the shape which substantially circumscribes the sphere with the radius of approximately r/n if the spherical portion is the hyper-hemispherical portion, it is possible to form the solid immersion lens in which the tilt margin between it and the object such as the optical recording medium can be increased and in which the assembly accuracy margin with other optical lens can be increased.

Further, in the above-mentioned solid immersion lens forming method, when the tip end portion of the solid immersion lens is processed as the shape which can satisfy the above-described equations (1) to (3) and it is also processed as the shape which substantially circumscribes the sphere with the diameter of approximately r if the spherical portion is the hemispherical portion or it is also processed as the shape which substantially circumscribes the sphere with the radius of approximately if the spherical portion is the hyper-hemispherical portion, it is possible to easily form the solid immersion lens with the large numerical aperture in which the tilt margin between it and the object such as the optical recording medium can be increased and in which the assembly accuracy margin with other optical lens can be increased.

Furthermore, in the above-mentioned respective solid immersion lens forming methods, when the tip end portion of the convex portion is processed by the focus ion beam process method, it is possible to form the objective lens with the extremely small area reliably with high accuracy as compared with the related art.

BRIEF DESCRIPTION OF THE DRAWINGS

FIG. 8A is a schematic side view showing an arrangement of an example of a solid immersion lens according to the present invention;

FIG. 8B is a schematic plan view showing an arrangement of an example of a solid immersion lens according to the present invention;

FIG. 9A is a schematic side view showing an arrangement of an example of a solid immersion lens according to the present invention;

FIG. 9B is a schematic plan view showing an arrangement of an example of a solid immersion lens according to the present invention;

FIG. 10 is a schematic diagram useful for explaining a numerical aperture of a solid immersion lens;

FIG. 11A is a schematic diagram showing an arrangement of an example of a solid immersion lens;

FIG. 11B is a schematic diagram showing an arrangement of an example of a solid immersion lens;

FIG. 11C is a schematic diagram showing an arrangement of an example of a solid immersion lens;

FIG. 11D is a schematic diagram showing an arrangement of an example of a solid immersion lens;

DESCRIPTION OF THE PREFERRED EMBODIMENTS

The present invention will now be described in detail with reference to the drawings.

The present invention can be applied to a solid immersion lens and a manufacturing method thereof, a condensing lens comprising this solid immersion lens and an optical lens with its optical axis coincident with the solid immersion lens and which is located on the opposite side of an objective lens side. Further, the present invention can be applied to an optical pickup device including this condensing lens and which adopts a so-called near-field optical recording and reproducing system and an optical recording and reproducing apparatus including this optical pickup device.

First, prior to the description of the solid immersion lens according to the present invention and a forming method thereof, embodiments in which the present invention was applied to the condensing lens, the optical pickup device and the optical recording and reproducing apparatus will be described with reference to FIGS. 2 to 6. In FIGS. 2 to 6, the shape of the solid immersion lens may be illustrated by simplifying an example of an arrangement of the present invention in order to facilitate explanation of its layout and arrangement and it is needless to say that the solid immersion lens can adopt other shapes of arrangements of the present invention containing examples following FIG. 7 which will be described later on.

Figures 1A, 1B:
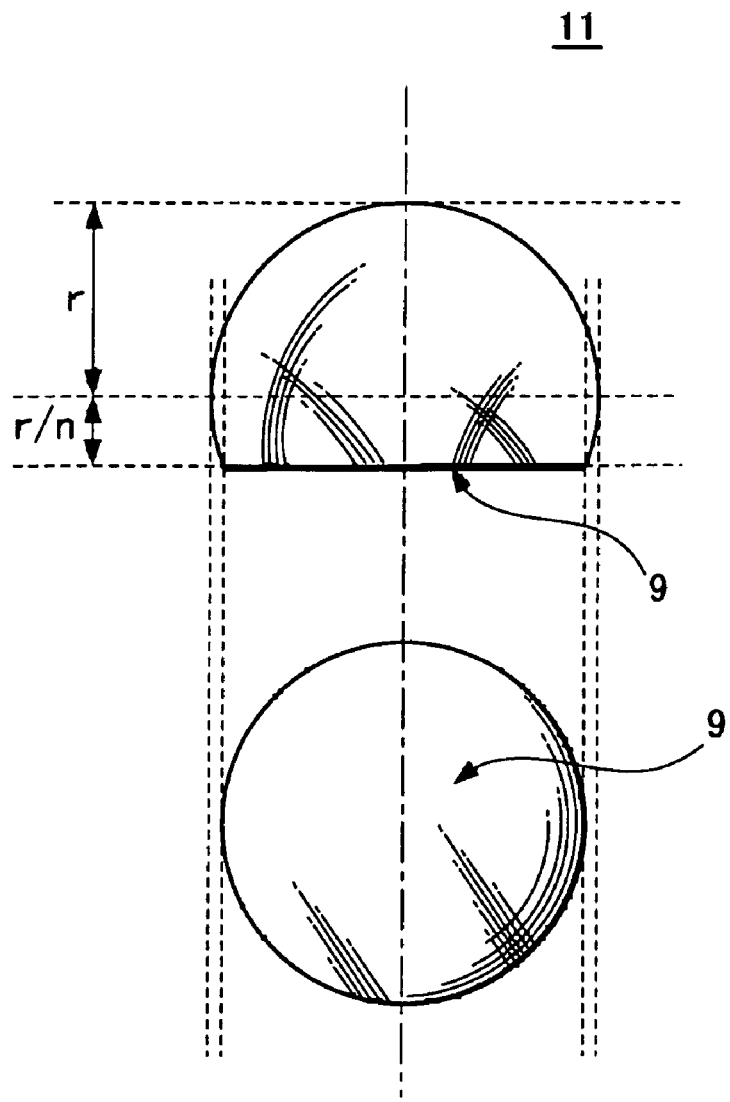
FIG. 1A is a schematic side view showing an arrangement of an example of a solid immersion lens according to the related art.
FIG. 1B is a schematic plan view showing an arrangement of an example of a solid immersion lens according to the related art.
Figure 2:
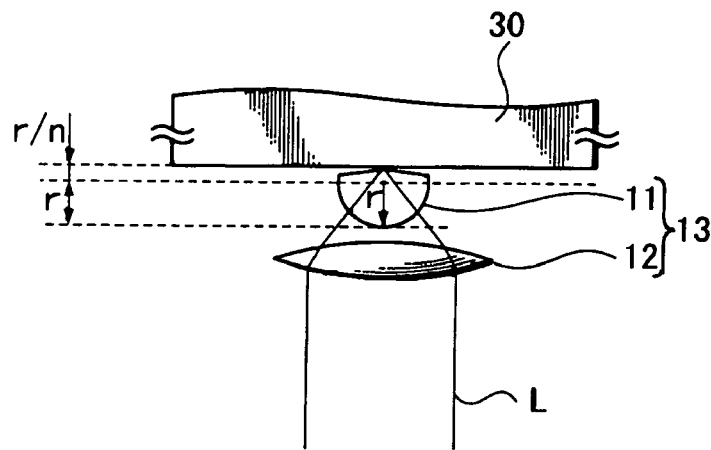
FIG. 2 is a schematic diagram showing arrangements of examples of a solid immersion lens and a condensing lens according to the present invention.

FIG. 2 is a schematic diagram showing an arrangement of an example of a condensing lens using a solid immersion lens according to the present invention. As shown in FIG. 2, a solid immersion lens 11 according to the arrangement of the present invention and an optical lens 12 with their optical axes coincident with each other are located relative to a lens object, for example, an optical recording medium 30, in this order. The solid immersion lens 11 is shaped like a hemispherical lens or a hyper-hemispherical lens with a radius of curvature r, that is, it is shaped like a hyper-hemispherical lens in the illustrated example. A thickness of the solid immersion lens 11 along its optical axis is expressed as r (1+1/n) where r represents a refractive index of the hemispherical lens and where n represents a refractive index of the hyper-hemispherical lens as shown in FIG. 2. According to this arrangement, it is possible to provide a condensing lens 13 of which numerical aperture is higher than a numerical aperture NA of the optical lens 12.

Although the solid immersion lens 11 and the optical recording medium 30 are not in contact with each other in actual practice, a space between the solid immersion lens 11 and the optical recording medium 30 is sufficiently small as compared with the thickness of the solid immersion lens 11. Hence, the above-mentioned space is not shown in FIGS. 2 to 6.

Figure 3:
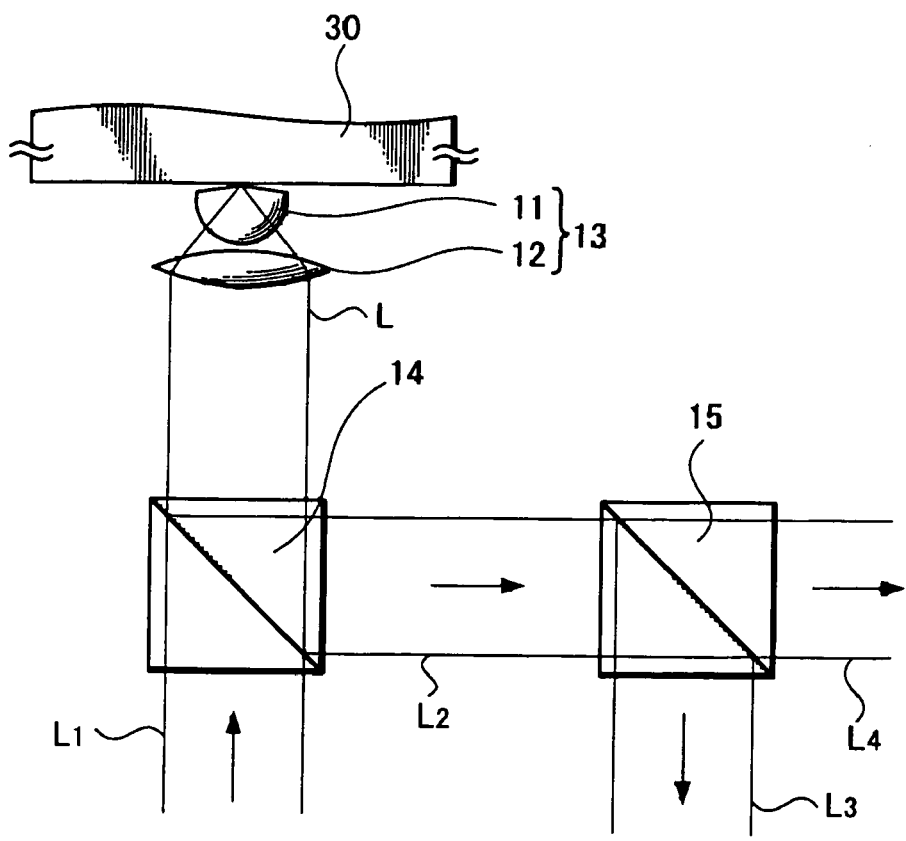
FIG. 3 is a schematic diagram showing an arrangement of an example of a condensing lens according to the present invention.

FIG. 3 is a schematic diagram showing an arrangement of an optical system of an optical pickup device using the solid immersion lens and the condensing lens shown in FIG. 2. As shown in FIG. 3, first and second beam splitters 14 and 15 are located between a light source and a photo-detector, not shown, and the condensing lens 13 composed of the solid immersion lens 11 and the optical lens 12. If the optical recording medium 30 is a disc-like optical recording medium, then it is mounted on a spindle motor, not shown, and is thereby rotated at a predetermined revolution rate.

Also, the optical pickup device shown in FIGS. 2 and 3 is provided with control drive means by which the condensing lens 13 can be moved in the tracking direction and the focusing direction.

As this control drive means, there may be enumerated a biaxial actuator for use with a general optical pickup, a slider for use with a magnetic head device and the like, for example.

An embodiment of the control drive means for the condensing means 13 will be described next.

Figure 4:
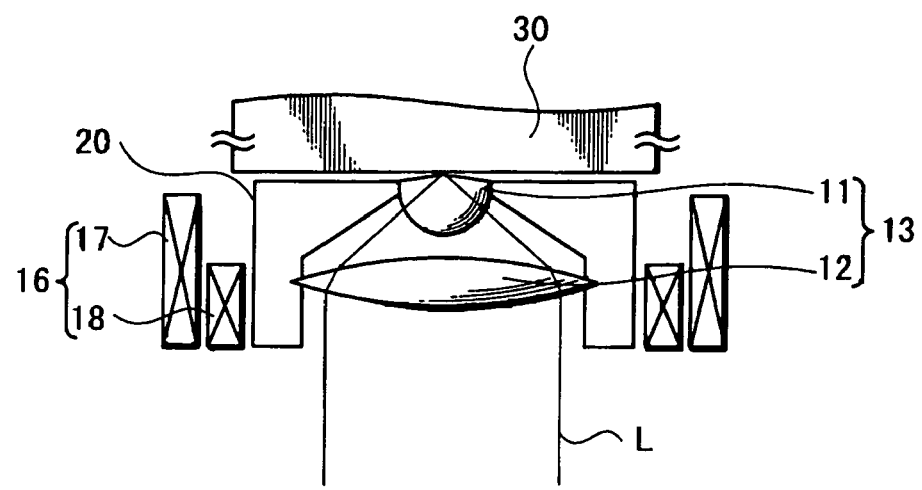
FIG. 4 is a schematic diagram showing an arrangement of an example of an optical pickup device according to the present invention.

FIG. 4 is a schematic diagram showing an arrangement of an example of an optical pickup device using a biaxial actuator as a control drive means. As shown in FIG. 4, the condensing lens 13 is fixed by a holding member 20 in such a manner that optical axes of the solid immersion lens 11 and the optical lens 12 may become coincident with each other. This holding member 20 is fixed to the biaxial actuator 16 by which the holding member 20 is moved in the focusing direction and/or the tracking direction.

As shown in FIG. 4, the biaxial actuator 16 is composed of a tracking coil 17 capable of moving the condensing lens 13 in the tracking direction and a focusing coil 18 capable of moving the condensing lens 13 in the focusing direction.

Then, the biaxial actuator 16 is able to control a distance between the optical recording medium 30 and the solid immersion lens 11 by feeding distance information back to the optical pickup device after it has monitored a light amount of returned light. Thus, under control of the biaxial actuator 16, a distance between the solid immersion lens 11 and the optical recording medium 30 can be kept substantially constant and the solid immersion lens 11 and the optical recording medium 30 can be prevented from colliding with each other.

Also, this biaxial actuator 16 is able to move a spot of focused light to a desired recording track by feeding position information back to the optical pickup device after it has monitored a light amount of returned light in the tracking direction.

Figure 5:
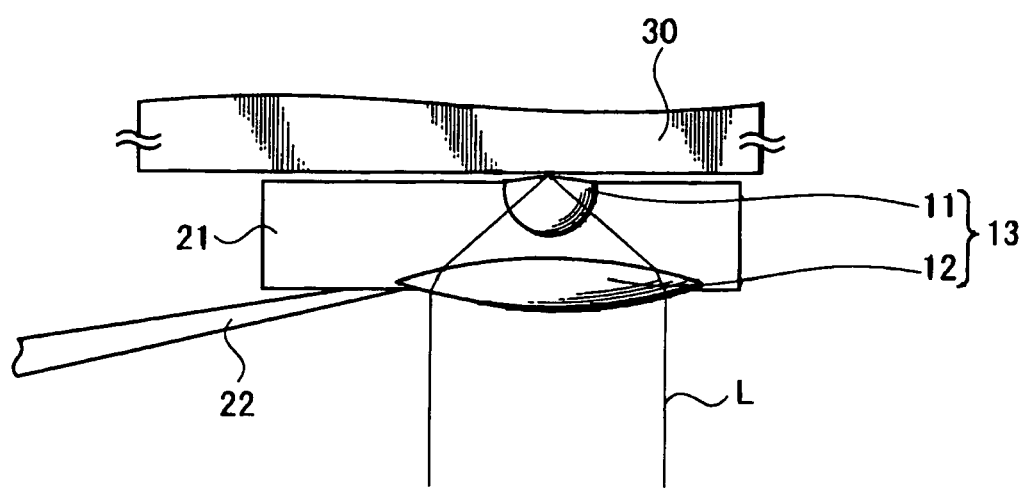
FIG. 5 is a schematic diagram showing an arrangement of an example of an optical pickup device according to the present invention.

FIG. 5 is a schematic diagram showing an arrangement of the optical pickup device which uses a slider as the control drive means of the condensing lens 13 shown in FIGS. 2 and 3.

As shown in FIG. 5, the condensing lens 13 can be fixed to a slider 21 which is moved in the tracking direction. This slider 21 is supported to a movable optical portion (not shown) movable in the tracking direction through a resilient member such as a gimbal 22 having resiliency only in the direction in which the optical recording medium 30 is rotated with fluctuations or other resilient member, not shown. Then, this movable optical portion is moved in the tracking direction by a control drive means composed of a suitable device such as a linear motor, whereby the condensing lens 13 can be opposed to a predetermined track.

Then, the flow of gas generated when the optical recording medium 30 is rotated is introduced into a space between the optical recording medium 30 and the slider 21 and a gas thin film which can balance with pushing force generated from the resilient member toward the side of the optical recording medium 30, whereby the slider 21 can fly with a constant distance kept relative to the optical recording medium, for example, a distance of 50 nm. That is, when information is reproduced from the optical recording medium 30 or information is recorded on the optical recording medium 30 while the optical recording medium 30 is rotated at a predetermined revolution rate, a distance between the solid immersion lens 11 comprising the condensing lens 13 and the optical recording medium 30 can be kept nearly constant by the slider 21.

A schematic arrangement of the optical pickup device will hereinafter be described again with reference to FIG. 3. As shown in FIG. 3, outward light emitted from a semiconductor laser, for example, is converted into parallel light (L1) by a collimator lens (not shown) and passed through the first beam splitter 14 (light L) and focused on the information recording surface of the optical recording medium 30 through the condensing lens 13. Inward light reflected on the information recording surface of the optical recording medium 30 is passed through the condensing lens 13, reflected by the first beam splitter 14 and it is introduced into the second beam splitter 15. Then, inward lights (L3 and L4) split by this second beam splitter 15 are focused on a focusing photo-detector (not shown) and a signal photo-detector (not shown) to thereby detect a focusing error signal, a reproduced pit signal and so forth.

Also, the inward lights reflected by the second beam splitter 15 are focused on a tracking photo-detector (not shown) and thereby a tracking error signal is detected. If necessary, this optical pickup device may include a relay lens inserted between the first beam splitter 14 and the optical lens 12 to correct a remaining focus error component followed by the biaxial actuator with the condensing lens 13 fixed thereto or the slider or an error component generated in the assembly process of the condensing lens 13 by changing a space between the two lenses.

When the solid immersion lens 11 and the optical lens 12 are fixed to the slider 21, the solid immersion lens 11 comprising the condensing lens 13 may be fixed to the slider 21 and the optical lens 12 may be arranged so as to move in the optical axis direction by a suitable means such as a piezoelectric element as a means for correcting the remaining focus error component followed by the slider 21 and the error component generated from the assembly process of the condensing lens 13.

Figure 6:
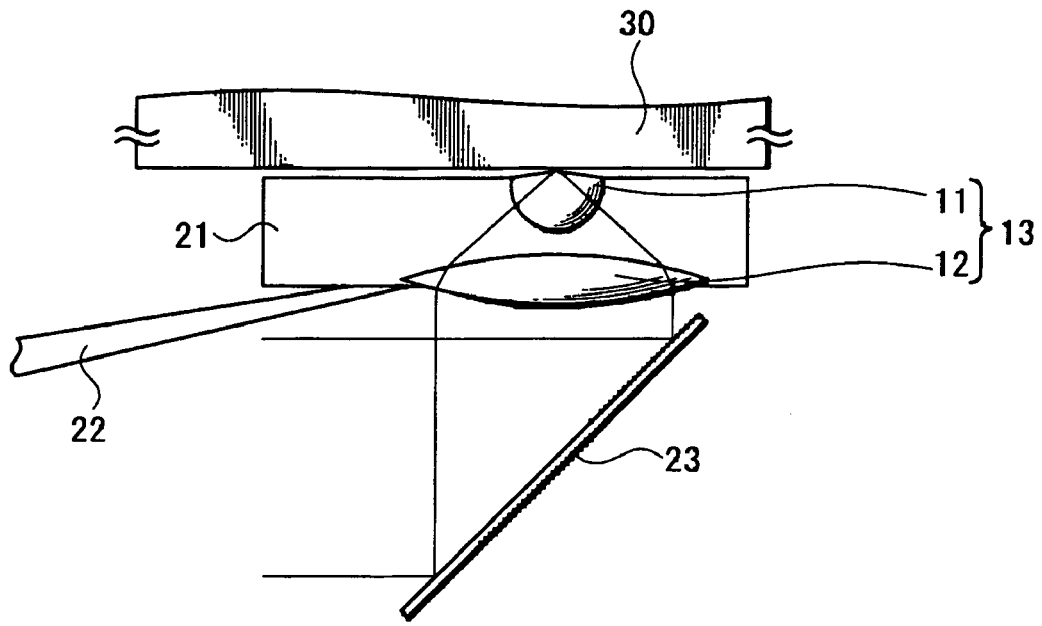
FIG. 6 is a schematic diagram showing an arrangement of an example of an optical pickup device according to the present invention.

Also, when the spindle motor is applied to an optical recording and reproducing apparatus including a means on which a plurality of optical recording mediums is mounted, as shown in FIG. 6 which is a schematic diagram showing an arrangement of an optical recording and reproducing apparatus, it is suitable that a mirror 23 with its optical axis bent at an angle of substantially 90 degrees should be provided on the slider 21. In FIG. 6, elements and parts identical to those of FIG. 5 are denoted by identical reference numerals and therefore need not be described. Since the optical recording and reproducing apparatus having the above-mentioned arrangement can decrease a space between it and the optical recording medium, as a result, the optical recording and reproducing apparatus can be miniaturized in size and it can be decreased in thickness.

The optical pickup device may contain a reproduction-only optical pickup device capable of only reproduction, a recording-only optical pickup device capable of only recording and a recording and reproducing optical pickup device capable of both reproduction and recording. Further, the above-mentioned respective optical pickup devices may have arrangements in which the optical pickup device has a magnetic coil and the like assembled in a part thereof by a combination of a magneto-optical recording system and a near-field optical reproduction system. Furthermore, the optical recording and reproducing apparatus may contain a reproduction-only apparatus capable of only reproduction, a recording-only apparatus capable of only recording and a recording and reproducing apparatus capable of both recording and reproduction.

Next, the shape of the solid immersion lens having the arrangement of the present invention will be described.

Figure 7:
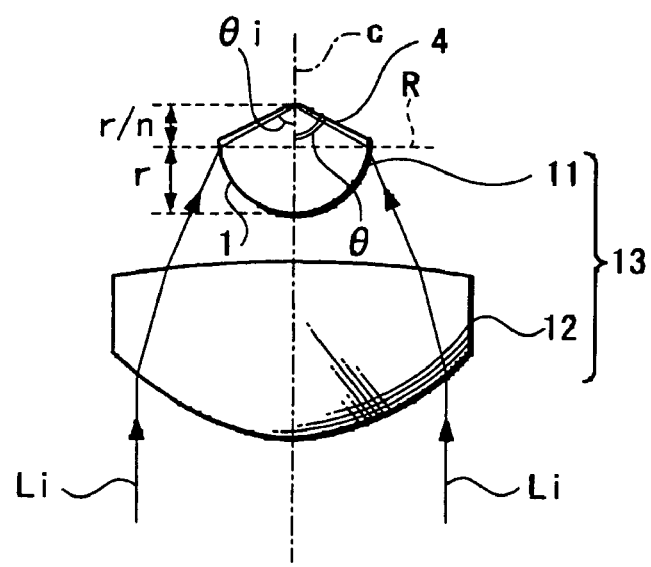
FIG. 7 is a schematic diagram showing an arrangement of an example of a solid immersion lens according to the present invention.

As described above, in the solid immersion lens according to the present invention, as FIG. 7 shows a schematic diagram showing an arrangement of an example in which a solid immersion lens is combined with an optical lens, when the inclined portion 4 is formed on at least a part of the solid immersion lens 11 from its tip end portion of the objective side to the spherical portion 1 and θi assumes an angle of incidence of light introduced into the solid immersion lens 11, an inclination angle θ from the optical axis of the inclined portion 4 is expressed as:

$$\theta \geq \theta i$$

In FIG. 7, a dot-and-dash line c shows the optical axis of the solid immersion lens and the optical axis of the optical lens 12 disposed on the opposite side of its objective side. A broken line R shows the cross-section in which a diameter becomes 2r in the cross-section perpendicular to the optical axis of the solid immersion lens 11.

FIGS. 8A and 8B and FIGS. 9A and 9B are side views and front views showing arrangements obtained when the spherical portion 1 of the solid immersion lens 11 is shaped like a hemispherical portion and it is shaped like a hyper-hemispherical portion, respectively. In FIGS. 8A, 8B and FIGS. 9A, 9B, elements and parts identical to those in FIG. 7 are denoted by identical reference numerals and therefore need not be described. While the tip end face 5 of the objective side of the inclined portion is illustrated in the form of the flat surface in FIGS. 8A, 8B and FIGS. 9A, 9B, it is possible that a convex portion may be formed on this portion as will be described later on.

As shown in FIGS. 8A and 9A, the solid immersion lens 11 has the spherical portion 1 shaped as the hemispherical portion or the hyper-hemispherical portion on the opposite side of the objective side, that is, the hyper-hemispherical portion in the illustrated example. When r assumes the radius of curvature of the hyper-hemispherical portion and n assumes the refractive index thereof, the thickness extending along the optical axis is expressed as r if the spherical portion is the hemispherical portion and it is expressed as r(1+1/n) if the spherical portion is the hyper-hemispherical portion.

In the following examples, the case in which the spherical portion is the hyper-spherical portion is shown as a representing example and the case in which the spherical portion is the hemispherical portion is not shown.

The angle of incidence θi of light incident on the solid immersion lens 11 falls within a range expressed as:

$$0° < \theta i < 90°$$

The reason for this will be described below with reference to FIG. 10. FIG. 10 is a schematic diagram showing an arrangement of a condensing lens using a solid immersion lens. In this case, a numerical aperture of the condensing lens using the solid immersion lens will be described. As shown in FIG. 10, when θi0 assumes an angle of incidence from the optical axis of light introduced from the optical lens 12 disposed on the opposite side of the objective surface of the solid immersion lens 11 to the solid immersion lens 11, θi assumes the angle of incidence of light introduced into the solid immersion lens 11, NA assumes the numerical aperture of the optical lens 12 and n assumes the refractive index of the solid immersion lens, we have the following equalities:

$$\sin \theta i0 = NA$$

$$n \sin \theta i0 = \sin \theta i$$

Thus, an effective numerical aperture (SIL) of the condensing lens comprised of the solid immersion lens 11 is expressed as:

$$NA\ (SIL) = n^2 \sin\theta i0$$
$$= n\sin\theta i$$

When θi is nearly 90°, the effective numerical aperture of the condensing lens comprised of the solid immersion lens 11 becomes NA (SIL)=n, that is, it becomes maximum.

FIGS. 11A to 11D are schematic diagrams showing arrangements of the condensing lenses obtained when the angle of incidence θi of light incident on the solid immersion lens 11 is increased progressively, respectively. As shown in FIGS. 11A to 11D, as the angle of incidence θi increases, the effective numerical aperture NA (SIL) of the condensing lens comprised of the solid immersion lens 11 increases. Thus, as the angle of incidence θi approaches to 90°, the effective numerical aperture NA (SIL) of the condensing lens approaches to the maximum value n. In FIGS. 11A to 11D, elements and parts identical to those of FIG. 7 are denoted by identical reference numerals and therefore need not be described.

In other words, although it is desirable that the angle of incidence θi should be larger in order to obtain a larger numerical aperture, with respect to the manufacturing margin, it becomes difficult to process the shape of the condensing lens with high accuracy and also it becomes difficult to bond the holding member for holding the lens to the condensing lens. As a result, the effective numerical aperture decreases as the angle of incidence θi increases, and hence it becomes difficult to increase a yield of the condensing lens.

Therefore, in order to maintain a certain amount of the manufacturing margin, it is desired that light should be introduced from the position substantially near the position shown by a broken line R. That is, in actual practice, it is desired that the angle of incidence θi should be selected to be approximately $\tan^{-1}(n)$.

We have examined shapes of inclined portion edge portions continued to the spherical portions obtained when the angle of incidence of the light incident on the solid immersion lens and the inclination angle of the inclined portion are changed.

FIGS. 12 to 17 are schematic diagrams showing arrangements of solid immersion lenses. As shown in FIGS. 12 to 17, the following examples show the cases in which the solid immersion lens 11 has the inclined portion 4 shaped as a circular cone-like inclined portion or as a pyramid-like inclined portion from the tip end portion of the objective side of the solid immersion lens 11 to the spherical portion 1. In the following examples, the objective side tip end face 5 is shaped like substantially a circular objective side tip end face. When y assumes the radius of the circular objective side tip end face, x assumes the radius from the optical axis c to the edge portion continued to the spherical portion of the inclined portion 4, a assumes the height from the objective surface opposing the optical recording medium 30, xi assumes the distance from the optical axis c at the incident position of light with the angle of incidence θi and ai assumes the height from the objective surface, a difference ai-a between the incident position and the inclined portion edge portion was calculated from θ and θi by the following equations:

$$\tan \theta i = xi/ai$$

$$r^2 = xi^2 + \{(r/n) - ai\}^2$$

$$\tan \theta = a/(x-y)$$

$$r^2 = x^2 + \{(r/n) - a\}^2$$

Figure 12:
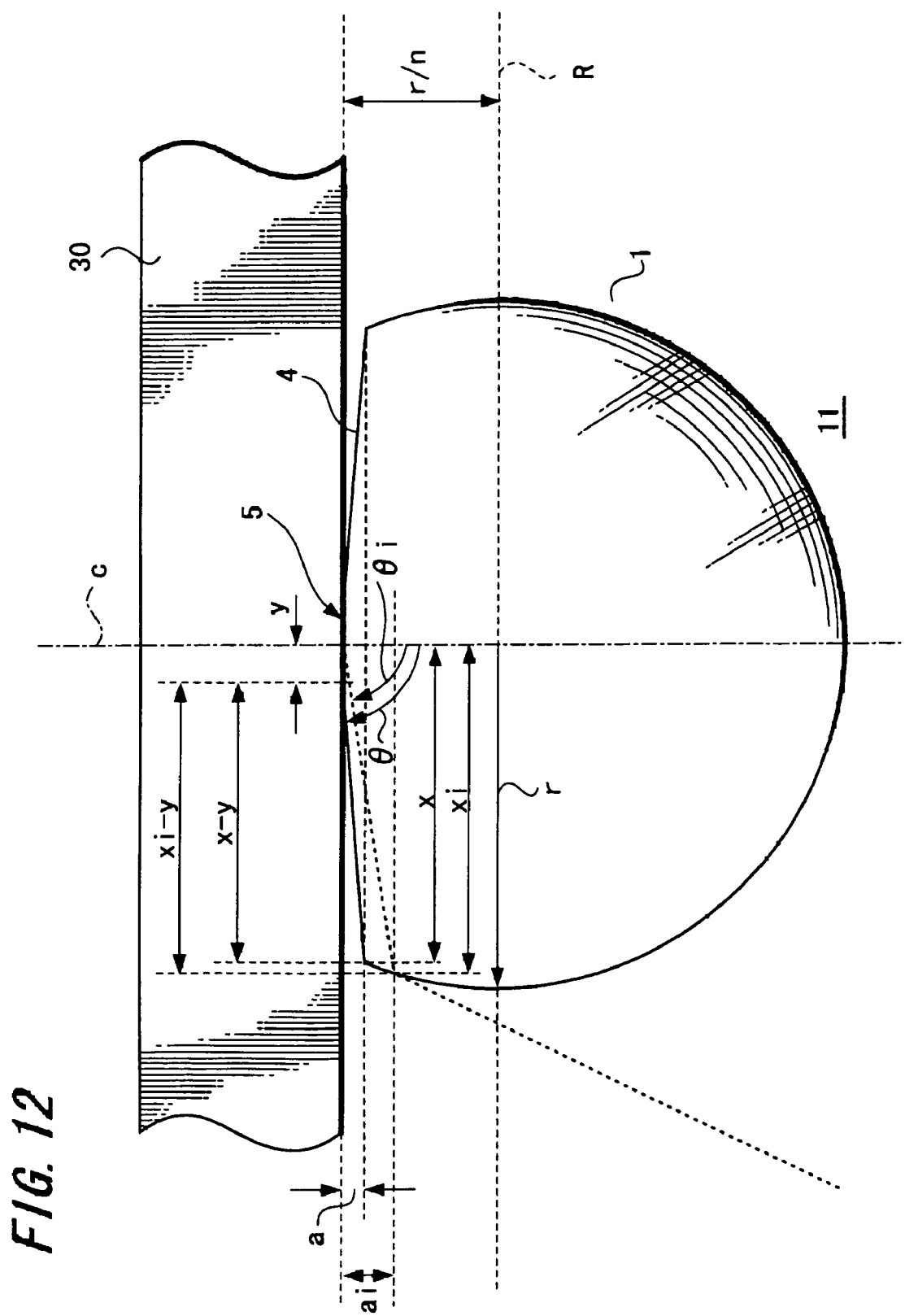
FIG. 12 is a schematic diagram showing an arrangement of a main portion of an example of a solid immersion lens according to the present invention.
Figure 13:
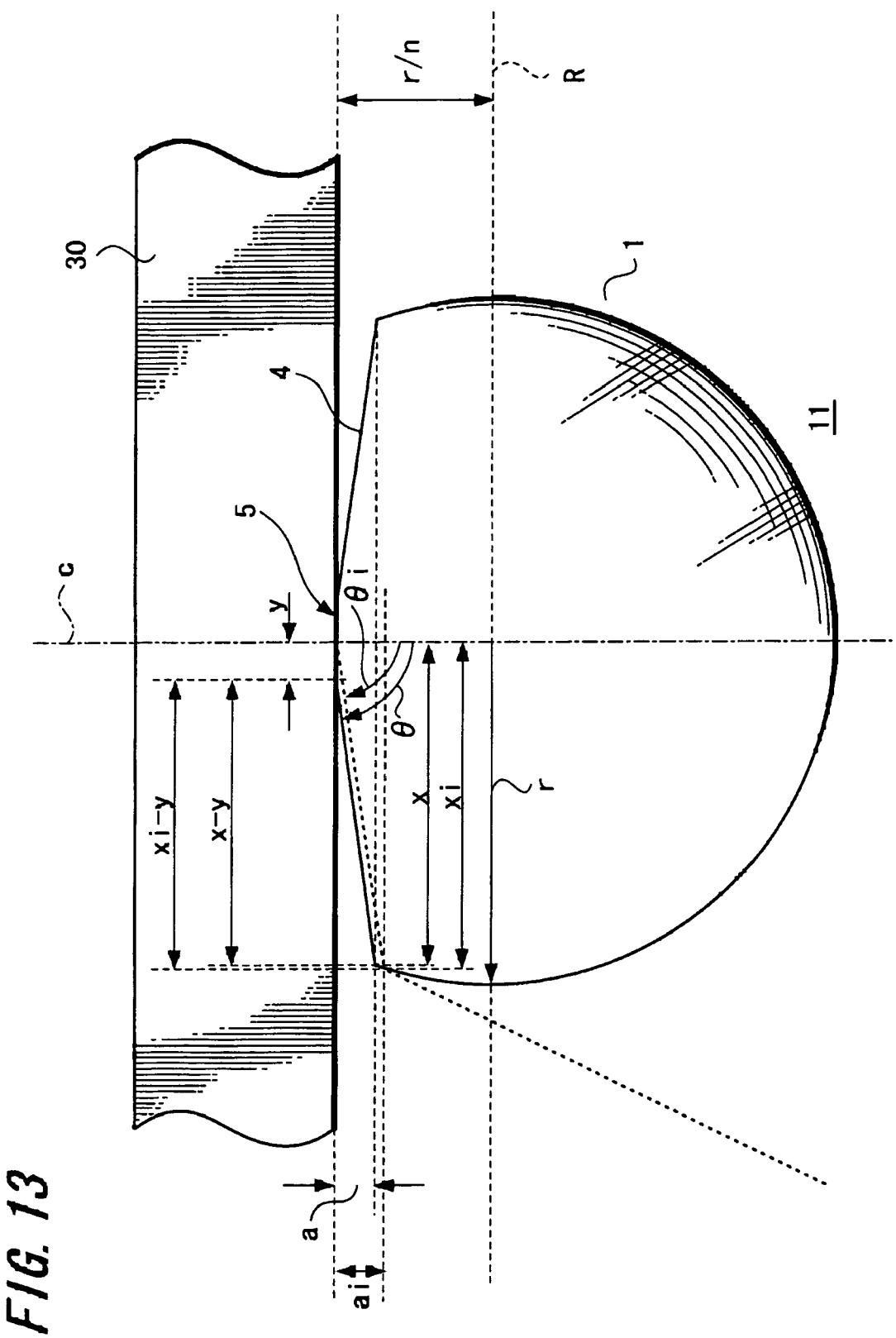
FIG. 13 is a schematic diagram showing an arrangement of a main portion of an example of a solid immersion lens according to the present invention.
Figure 14:
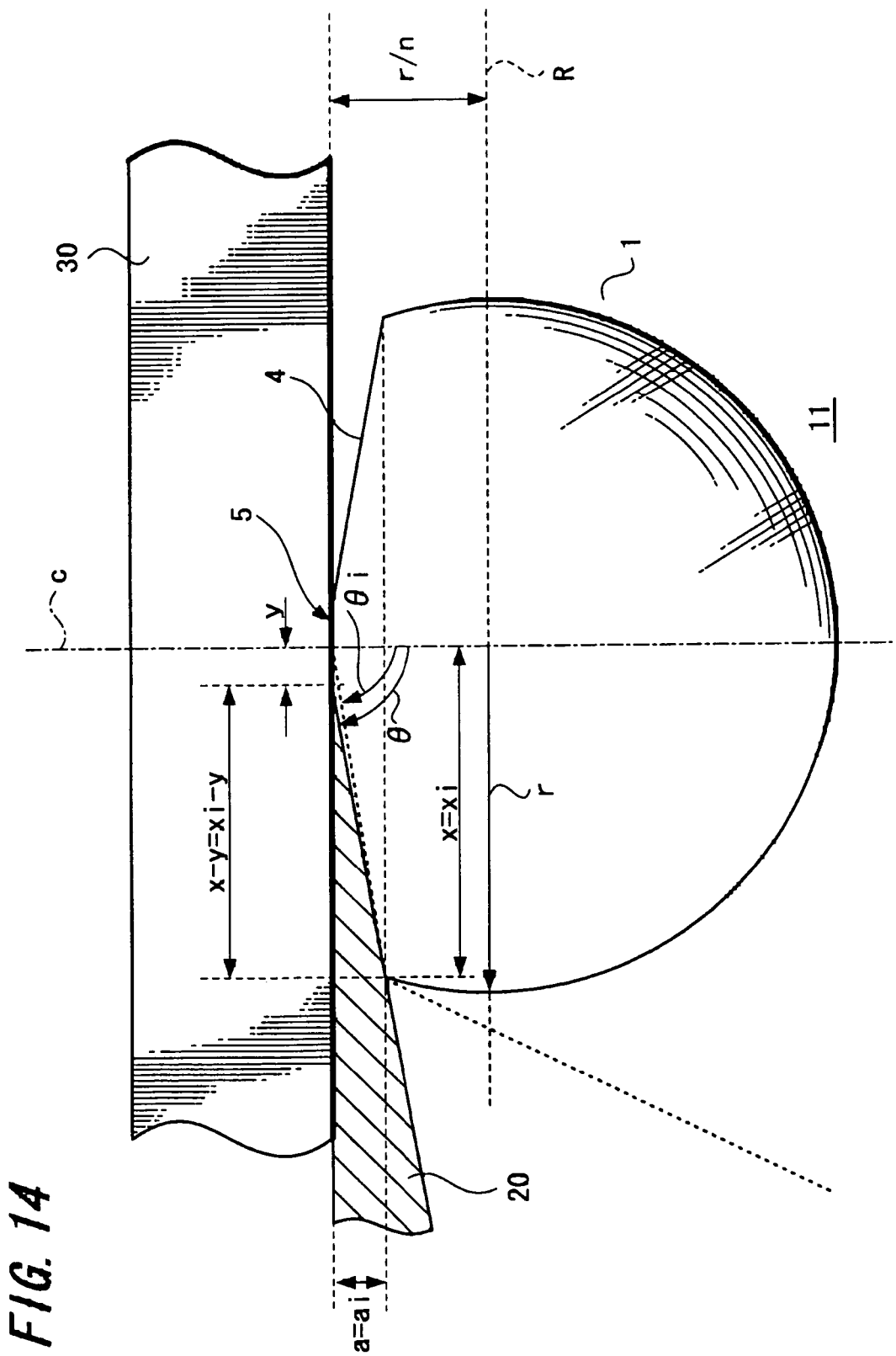
FIG. 14 is a schematic diagram showing an arrangement of a main portion of an example of a solid immersion lens according to a comparative example.

First, in the examples shown in FIGS. 12 to 14, the radius of curvature r of the spherical portion 1 was selected to be 0.45 mm, the radius y of the tip end face 5 was selected to be 20 μm, LAH (trade name manufactured by OHARA CORPORATION) having a refractive index n was used as a material of a lens, the solid immersion lens having the numerical aperture NA of 1.99 was used, the angle of incidence θi of its incident light Li was selected to be 73.6 degrees, the inclination angle θ of the inclined portion 4 was selected to be 80 degrees in the case of the inventive example shown in FIG. 12, it was selected to be 73.6 degrees equal to the angle of incidence θi in the case of the inventive example 2 shown in FIG. 13 and it was selected to be 72.9 degrees in the case of the comparative example 1 shown in FIG. 14.

In the inventive example 1 shown in FIG. 12, a height a from the objective surface of the edge portion of the inclined portion 4 was selected to be 71.6 μm, a height ai of the incident position of light having an incidence angle θi was selected to be 129.95 μm and a difference between the height a and the height ai was selected to be 58.35 μm.

In the inventive example 2 shown in FIG. 13, a height a from the objective surface of the edge portion of the inclined portion 4 was selected to be 123.7 μm, a height ai of the incident position of light having an incidence angle θi was selected to be 129.95 μm and a difference between the height a and the height ai was selected to be 6.25 μm.

In the comparative example 1 shown in FIG. 14, a height a from the objective surface of the edge portion of the inclined portion 4 was selected to be 129.95 μm, a height ai of the incident position of light having an incidence angle θi was selected to be 129.95 μm and a difference between the height a and the height ai was selected to be 0 μm.

These results are shown on the following table 1.

TABLE 1

| | Laser incident angle θi | Circular cone angle θ | Difference between incident position and inclined portion edge portion hi − h |
|---|---|---|---|
| Inventive example 1 (in case of θ > θi) | 73.6 degrees | 80 degrees | 58.4 μm |
| Inventive example 2 (in case of θ = θi) | 73.6 degrees | 73.6 degrees | 6.3 μm |
| Comparative example 1 (in case of θ < θi) | 73.6 degrees | 72.9 degrees | 0 μm |

As is clear from these results, when the inclined angle θ of the inclined portion is smaller than the incidence angle θi of the incident light, the incident light Li becomes substantially coincident with the edge portion of the inclined portion 4 and an influence such as the occurrence of interference on the edge portion is exerted upon the incident light. Also, at that time, since the whole of the peripheral edge portion of the spherical portion 1 becomes the surface through which the incident light passes, the holding member 20 of the solid immersion lens 11 cannot be bonded to this portion. As a result, as shown in FIG. 14, the holding member 20 is shaped as a triangle in cross-section and its one surface may be bonded to only the inclined portion 4 of the solid immersion lens 11. In this case, force cannot be applied to the optical axis from the outer peripheral side of the solid immersion lens 11 and hence a problem arises, in which it becomes difficult to hold the solid immersion lens 11 stably.

Thus, it becomes clear that it is desired that the inclined angel θ should be selected to be larger than the incidence angle θi of incident light in order to stably hold the solid immersion lens 11.

Figure 15:
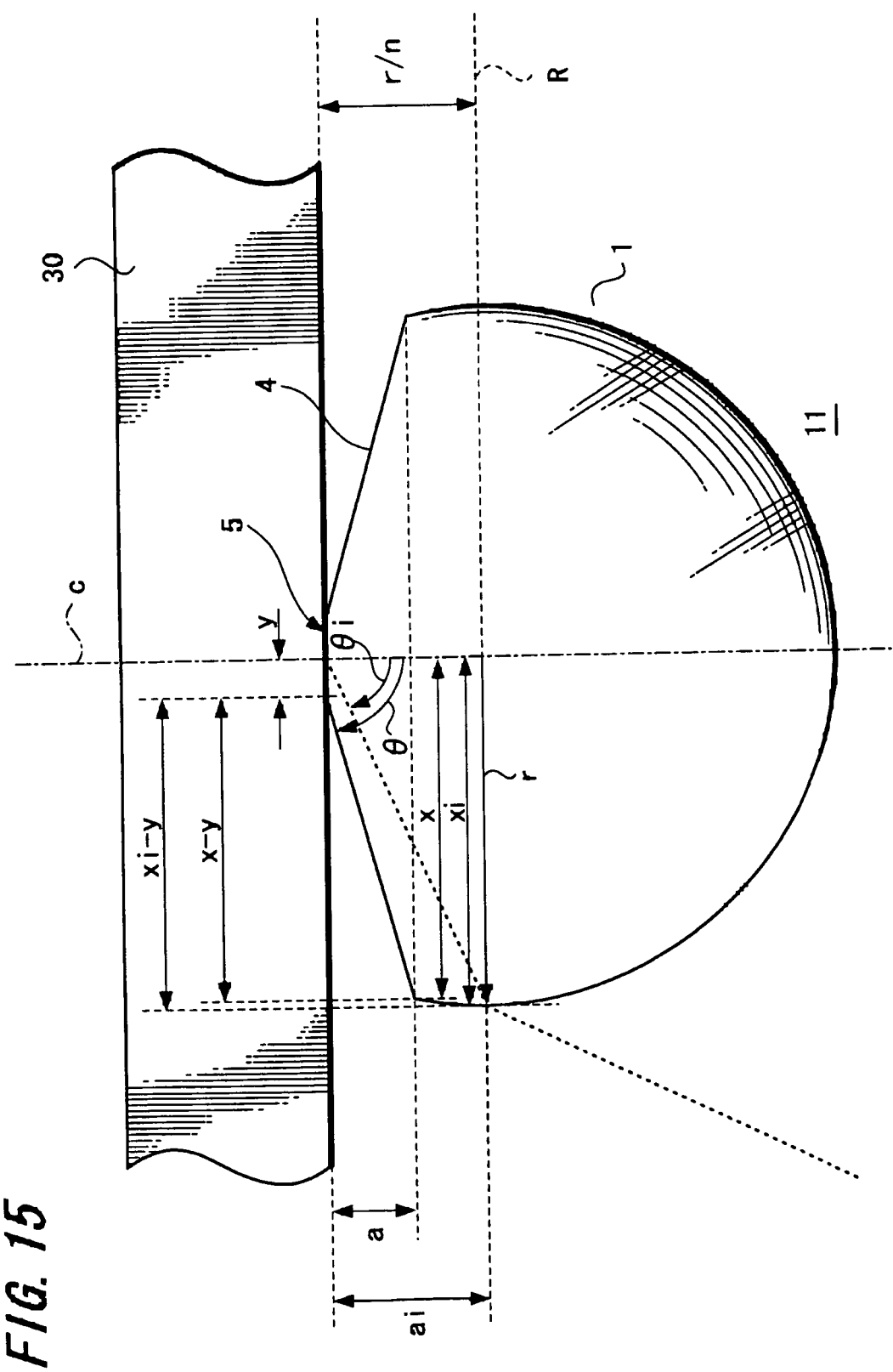
FIG. 15 is a schematic diagram showing an arrangement of a main portion of an example of a solid immersion lens according to the present invention.
Figure 16:
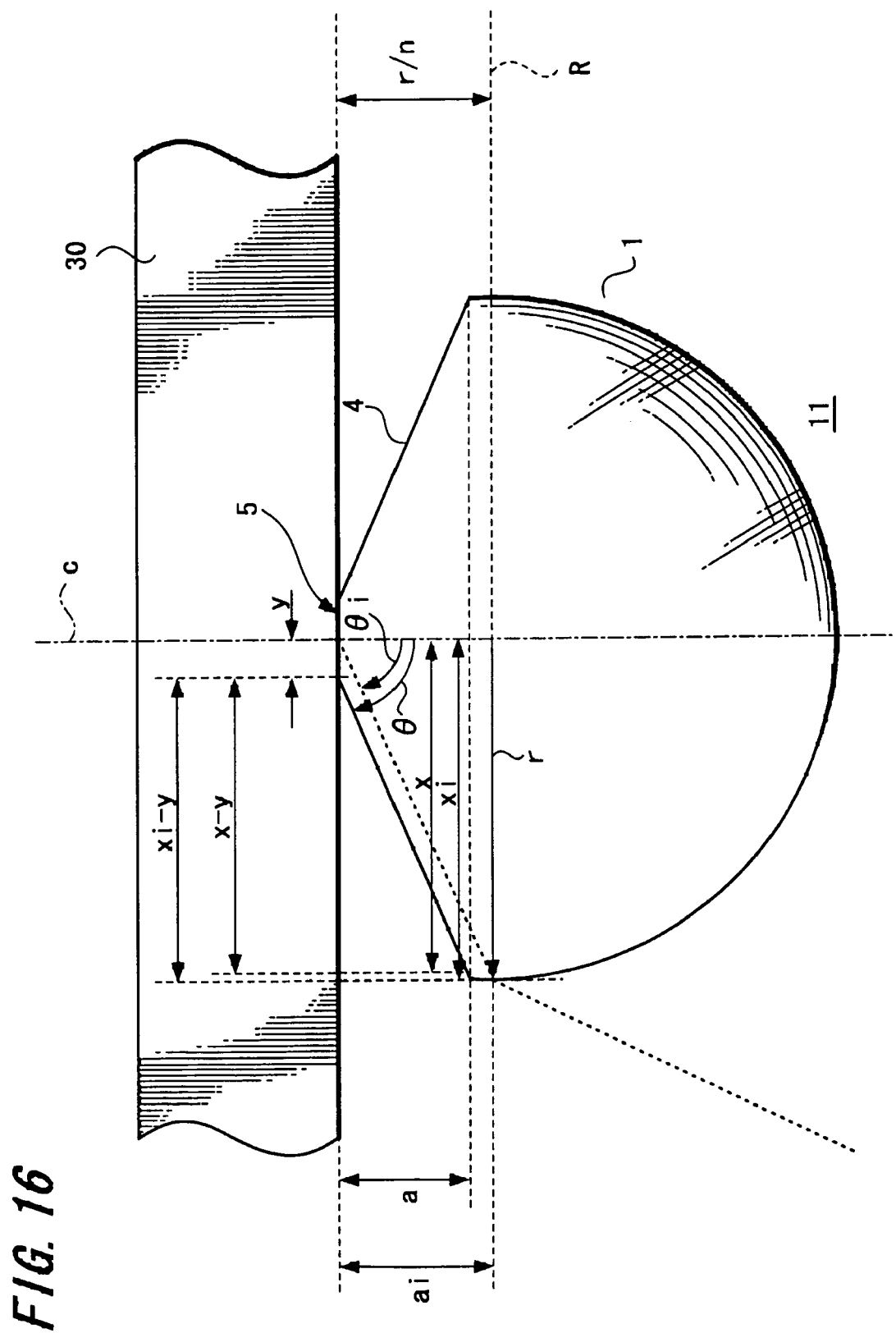
FIG. 16 is a schematic diagram showing an arrangement of a main portion of an example of a solid immersion lens according to the present invention.
Figure 17:
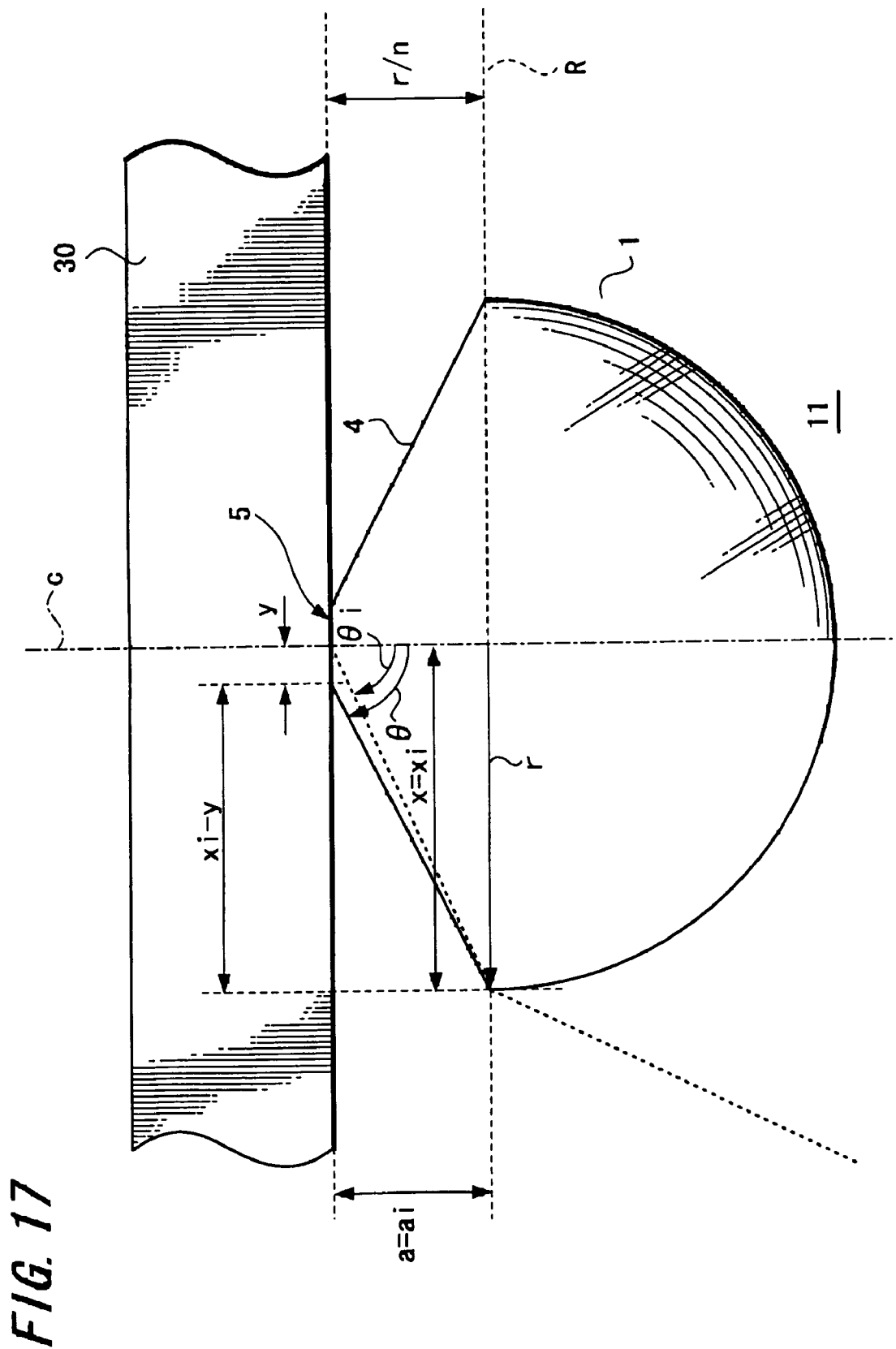
FIG. 17 is a schematic diagram showing an arrangement of a main portion of an example of a solid immersion lens according to a comparative example.

Next, in the examples shown in FIGS. 15 to 17, we had examined the cases in which the radius of curvature r of the spherical portion 1, the radius y of the tip end face 5 and the material of the lens were selected to be similar to those of the comparative example 1, the numerical aperture NA was selected to be 1.87 and the incidence angle θi of the incident light Li was selected to be 64.3 degrees. In this case, the incidence angle θ of the inclined portion 4 was selected to be 70 degrees in the case of the inventive example 3 shown in FIG. 15, it is selected to be 64.3 degrees equal to the incidence angle θi in the inventive example 4 shown in FIG. 16 and it is selected to be 63.3 degrees in the comparative example 3 shown in FIG. 15.

In the inventive example 3 shown in FIG. 15, a height a from the objective surface of the edge portion of the inclined portion 4 was selected to be 155.0 μm, a height ai of the incident position of light having an incidence angel θi was selected to be 216.6 μm and a difference between the height a and the height ai was selected to be 61.6 μm.

In the inventive example 4 shown in FIG. 16, a height a from the objective surface of the edge portion of the inclined portion 4 was selected to be 206.9 μm, a height ai of the incident position of light having an incidence angel θi was selected to be 216.6 μm and a difference between the height a and the height ai was selected to be 9.7 μm.

In the comparative example 2 shown in FIG. 17, a height a from the objective surface of the edge portion of the inclined portion 4 was selected to be 216.6 μm, a height ai of the incident position of light having an incidence angel θi was selected to be 216.6 μm and a difference between the height a and the height ai was selected to be 0 μm.

These results are shown on the following table 2.

TABLE 2

| | Laser incident angle θi | Inclination angle θ | Difference between incident position and inclined portion edge portion hi − h |
|---|---|---|---|
| Inventive example 3 (in case of θ > θi) | 64.3 degrees | 70 degrees | 61.6 μm |
| Inventive example 4 (in case of θ = θi) | 64.3 degrees | 73.6 degrees | 9.7 μm |

TABLE 2-continued

|  | Laser incident angle θi | Inclination angle θ | Difference between incident position and inclined portion edge portion hi − h |
|---|---|---|---|
| Comparative example 2 (in case of θ < θi) | 64.3 degrees | 72.9 degrees | 0 μm |

That is, also in these cases, when the inclination angel θ of the inclined portion 4 is smaller than the incidence angel θi of the incident light, the incident light Li becomes substantially coincident with the edge portion of the inclined portion 4 and hence the incident light is affected. Further, also in this case, it is difficult to hold the solid immersion lens 11 strongly similarly to the above-mentioned comparative example 1. Hence, it is clear that it is desired that the incidence angel θ should be selected to be larger than the incidence angel θi of the incident light in order to stably hold the solid immersion lens 11.

Figure 18:
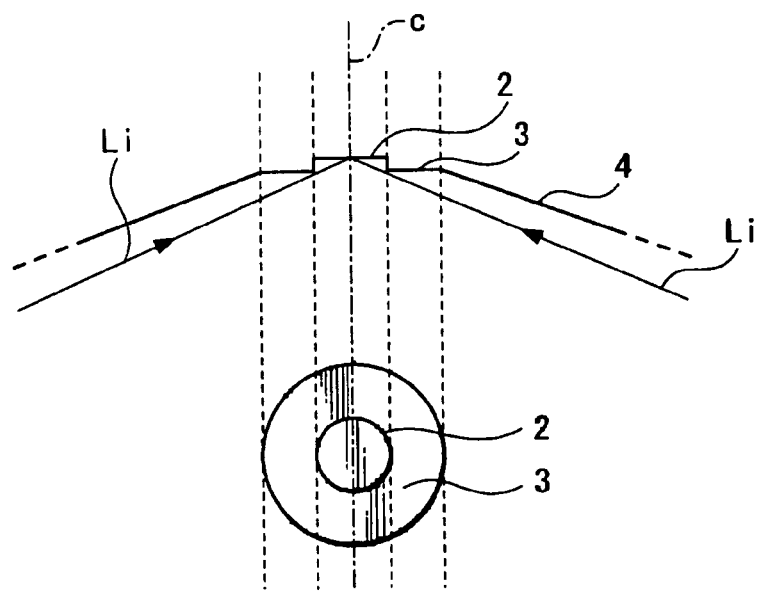
FIG. 18 is a schematic diagram showing an arrangement of a main portion of an example of a solid immersion lens according to the present invention.

Next, FIG. 18 is a schematic diagram showing an arrangement of a main portion of the solid immersion lens according to the present invention. An example in which the inclined portion has the convex portion 2 formed on its tip end portion so as to protrude in the objective side and in which the tilt margin relative to the optical recording medium and the like is made larger will be described with reference to FIG. 18.

In the solid immersion lens 11 according to the present invention, thee inclined portion 4 is shaped as a circular cone or a pyramid or a shape containing a curved surface comprising a part of the spherical surface.

Also, the convex portion 2 may be cylindrical or prism and its shape of the cross-section which becomes perpendicular to the optical axis c can take various shapes such as ellipse, rectangle, prism or curved surface. The illustrated example shows the case in which the convex portion 2 is shaped as cylinder, the flat surface portion 3 which is substantially parallel to the flat surface perpendicular to the optical axis c is formed around the convex portion 2 and the inclined portion 4 which is shaped like a circular cone, for example, is formed on the outer peripheral side of the flat surface portion 3.

The circumferential side surface of the spherical portion 1 becomes the surface by which it is fixed to the biaxial actuator or the slider.

The near-field optical recording and reproducing system relative to the magneto-optical recording medium needs a magnetic field upon recording and/or reproduction so that a suitable device such as a magnetic coil may be attached to a part of the objective surface of the first optical lens.

A material such as a laser light source of an optical recording and reproducing apparatus having a large refractive index relative to a wavelength of incident light, a large transmittance and a small light absorption may be suitably used as the material of this solid immersion lens 11. For example, a high refractive index glass manufactured by OHARA CORPORATION under the trade name of S-LAH79, $Bi_4Ge_3O_{12}$, $SrTiO_3$, $ZrO_2$, $HfO_2$, SiC, diamond, which are high refractive index ceramics and high refractive index single crystal materials, may be suitably used as the material of the solid immersion lens 11.

Also, it is desired that these lens materials should have amorphous structures or cubic structures in the case of the single crystal material. When the optical lens material has the amorphous structure or the cubic structure, its azimuths need not be matched at high accuracy and it is possible to use a conventional ball polishing method and a conventional polishing apparatus. Also, there are advantages in which an etching process and a polishing process for manufacturing an optical lens can be applied without worrying about the azimuth of the material.

Well-known etching method and etching apparatus available in the semiconductor process can be used to process the convex portion of the tip end portion of the solid immersion lens according to the present invention and the flat surface portion around the convex portion. In particular, when the very small tip end portion is processed, it is suitably use a focus ion beam (FIB) process method and a process apparatus such as focus ion beam process and TEM inspection equipment FB-2100 manufactured by HITACHI LTD., for example.

When the convex portion is formed by the FIB method as described above, the width of the objective surface can be miniaturized to be approximately several micrometers easily and reliably by ion beam of a very small spot having a diameter of approximately several tens of nanometers. Thus, it is possible to easily form a solid immersion lens with a large tilt margin relative to an optical recording medium as compared with the conventional one.

According to the solid immersion lens 11 having the above-mentioned arrangement, the area of the convex portion of its tip end portion can be miniaturized. For example, when the inclined portion is shaped like the cylinder, the radius of the objective surface can be decreased from several micrometers to approximately several tens of micrometers. Also, since it is sufficient that the radius of the inclined portion 4 such as the inclined portion having the circular cone shape and the like obtained before process can be selected in a range of from about several tens of micrometers to several hundreds of micrometers, a solid immersion lens with an extremely miniscule solid area of the objective surface can be realized by a forming method with a sufficiently margin of the process accuracy of the inclined portion.

In other words, when the solid immersion lens according to the present invention has the arrangement in which the convex portion is formed on the objective surface, this portion can easily be miniaturized irrelevantly of the radius of curvature r of the spherical portion. Accordingly, it becomes possible to make the radius of curvature of the spherical portion become extremely small as compared with that of the related art. As a result, since the lens can be decreased in diameter and miniaturized in size, the condensing lens using such solid immersion lens can be miniaturized and servo characteristics can be improved. Thus, it becomes possible to make the optical pickup device and the optical recording and reproducing apparatus become small in size, thin in thickness and high in performance.

Figure 19:
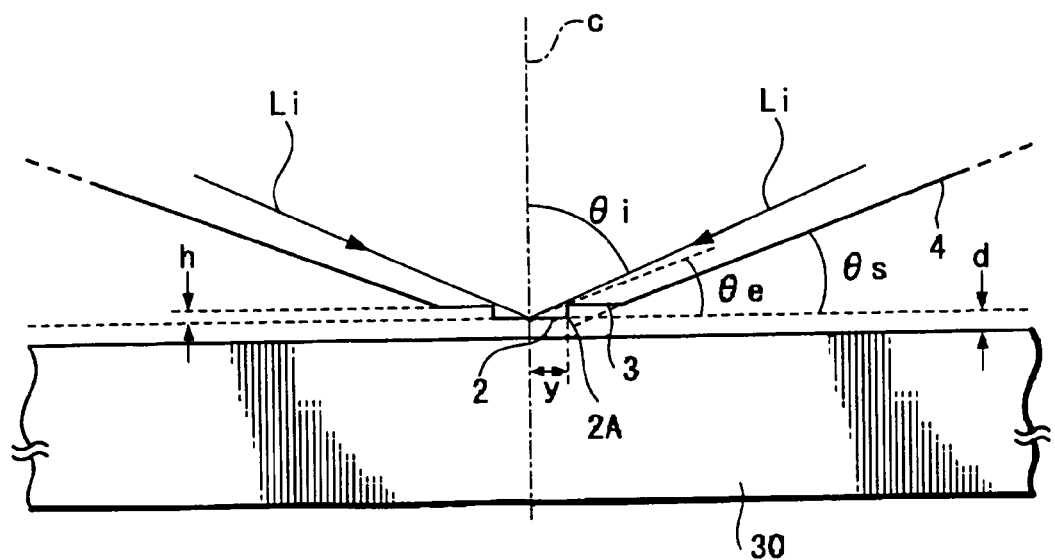
FIG. 19 is a schematic diagram showing an arrangement of a main portion of an example of a solid immersion lens according to the present invention.

Next, the arrangement of the solid immersion lens will be described in detail with reference to schematic diagrams showing the tip end portion of the solid immersion lens having the arrangement shown in FIGS. 19 and 20 together with the light path of incident light. In this case, in the solid immersion lens 11, its spherical portion 1 is shaped like a hemispherical portion or a hyper-hemispherical portion, that is, the hyper-hemispherical portion in the illustrated example. This example illustrates the case in which the radius of curvature of the spherical portion is assumed to be r, the refractive index is assumed to be n, the thickness in the direction extending along the optical axis is assumed to be $r(1+1/n)$, the inclined portion 4 having the circular cone shape, for example, is provided on the objective side, its tip end portion has the annular flat surface portion 3, for example, substantially parallel to the flat surface perpendicular to the optical axis c similarly to the example described with reference to FIG. 18 and in which the convex portion 2 having the cylindrical shape or the like is provided on the inside thereof.

In this arrangement, when the incident light Li is introduced in the optical recording medium 30 located relative to the objective side with the spacing d at the incidence angle θi, if the height h of the convex portion 2 and the length y from the optical axis c to the edge portion 2A are adapted to as to satisfy the above-described equation (1), that is, $$\tan^{-1}(h/y) < 90° - \theta i \qquad (1)$$

then an angel θe from the focusing position to this edge portion 2A can be made smaller than 90°−θi. As a consequence, incident light Li can reliably be focused on the objective surface without interrupting the incident light Li with the edge portion 2A of the convex portion 2.

As mentioned before, the incidence angel θi by which the numerical aperture can be increased and the manufacturing margin can be maintained with ease is given by the following equation:

$$\theta i = \tan^{-1}(n)$$

This incident light Li is light introduced from the position distant from the optical axis c by r in the cross-section shown by the aforementioned broken line R in this example in which the spherical portion is shaped as the hyper-hemispherical portion.

At that time, when the inclined angel θs from the flat surface perpendicular to the optical axis c of the inclined portion 4 is selected to be smaller than the angel θe, it is possible to construct the solid immersion lens without interrupting incident light by which the maximum numerical aperture can be obtained similarly.

Further, since this inclined portion 4 is formed by machine process, in consideration of the process margin, it is desired that the angel θe should be selected so as to satisfy the following equation:

$$\theta s \leq \theta e - 5°$$

Figure 20:
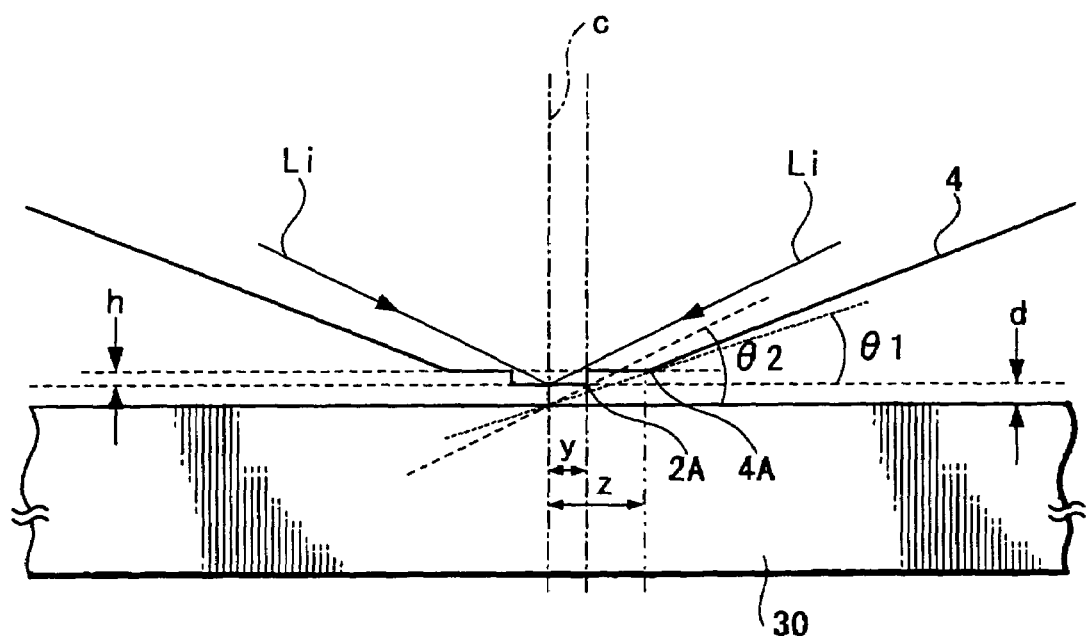
FIG. 20 is a schematic diagram showing an arrangement of a main portion of an example of a solid immersion lens according to the present invention.

Also, as shown in FIG. 20, when an angle θ1 from the focusing position of the optical recording medium 30 and an angle θ2 from the focusing position of the optical recording medium 30 to the edge portion 2A of the convex portion 2 are both increased, the tilt margin between the lens and the optical recording medium can be increased. That is, when the length from this optical axis c to the edge portion 4A of the objective side of the inclined portion 4 is assumed to be z and a gap between the solid immersion lens and the object is assumed to be d, the solid immersion lens is constructed as a shape that can satisfy the following equations:

$$\tan^{-1}((d+h)/z) \geq 0.10° \qquad (2)$$

$$\tan^{-1}(d/y) \geq 0.10° \qquad (3)$$

Thus, the tilt margin of the convex portion 2 and the tilt margin of the inclined portion 4 can be increased to be greater than 0.10° and hence it is possible to provide the solid immersion lens 11 which can obtain a sufficient tilt margin reliably as compared with the related art.

An example of a method for forming a solid immersion lens according to the present invention will be described with reference to process diagrams of FIGS. 21A to 21C. In each of FIGS. 21A to 21C, in order to facilitate the understanding o the shape of the solid immersion lens, a side view of the tip end portion and a plan view of the objective side are placed side by side.

Figure 21A:
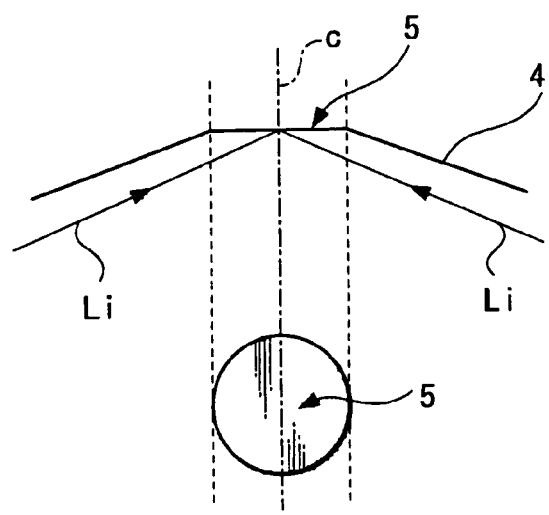
FIG. 21A is a process diagram showing an example of a method of forming a solid immersion lens according to the present invention.
Figure 21B:
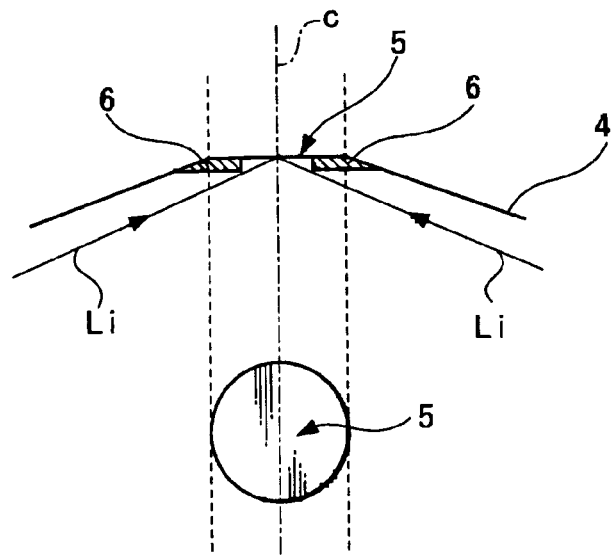
FIG. 21B is a process diagram showing an example of a method of forming a solid immersion lens according to the present invention.

In the solid immersion lens forming method according to the present invention, first, as shown in FIG. 21A, the inclined portion 4 having the suitable shape such as the circular cone, the pyramid or the curved surface is formed on a ball-like lens material made of the above-mentioned material by machine process, that is, cutting or polishing or the like, and the tip end face 5 is formed as a flat surface shape by a suitable process such as machine process.

Alternatively, after the ball-like lens material was formed as the hyper-hemispherical shape and the tip end face 5 was formed as the flat surface shape, they may be formed as the circular cone shape, pyramid shape or the curved surface, etc., and the inclined portion 4 may be formed.

Figure 21C:
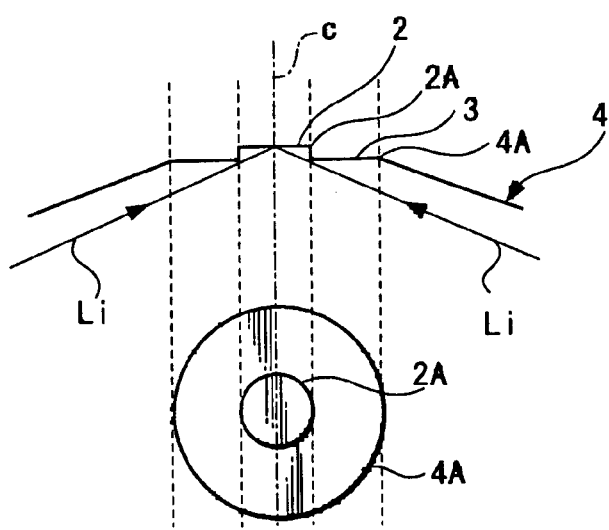
FIG. 21C is a process diagram showing an example of a method of forming a solid immersion lens according to the present invention.

Then, as shown in FIG. 20B, the etching processed portion 6 shown hatched around the tip end face 5, that is, the cylindrical outer portion is removed by the semiconductor process technology such as the above-mentioned FIB, whereby a solid immersion lens having the convex portion 2 having a suitable shape such as a cylinder can be formed as shown in FIG. 21C.

At that time, when the convex portion 2 is formed as the shapes described with reference to FIGS. 19 and 20, there can be obtained a solid immersion lens into which incident light having the maximum numerical aperture can be introduced reliably and in which a tilt margin between it and the medium can be increased.

Next, the cases in which a solid immersion lens is formed by the above-mentioned forming method while the dimension and shape of the tip end portion of the solid immersion lens are being changed will be described.

Figure 22:
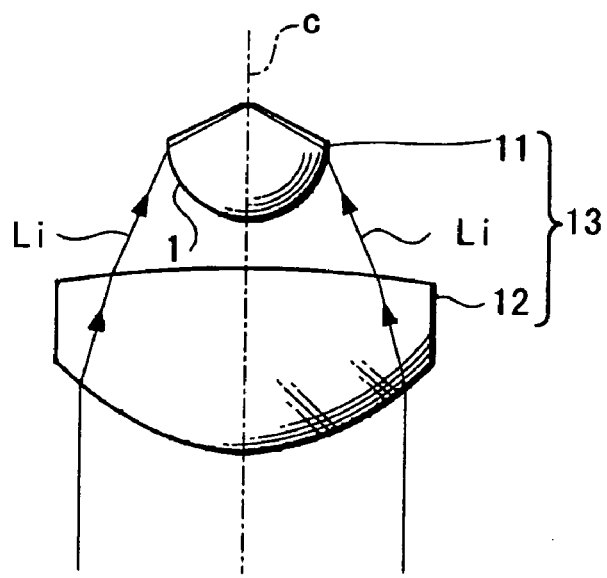
FIG. 22 is a schematic diagram showing an arrangement of a comparative example of a solid immersion lens.
Figure 23:
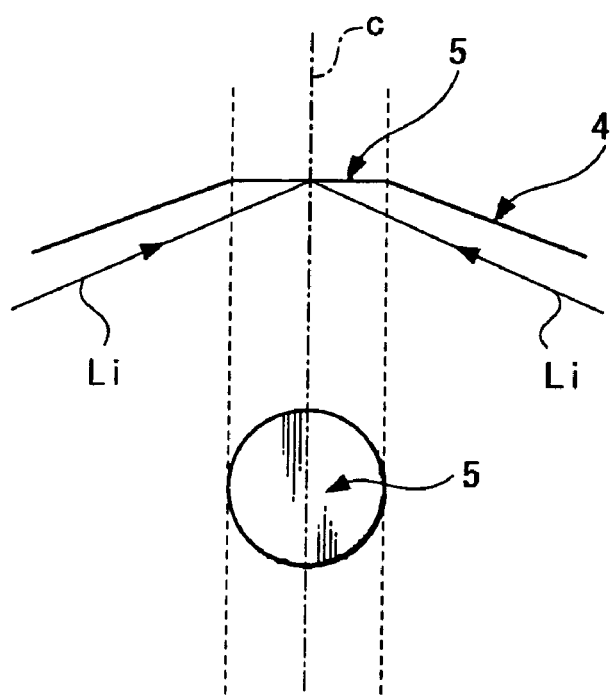
FIG. 23 is a schematic diagram showing an arrangement of a main portion of a comparative example of a solid immersion lens.
Figure 24:
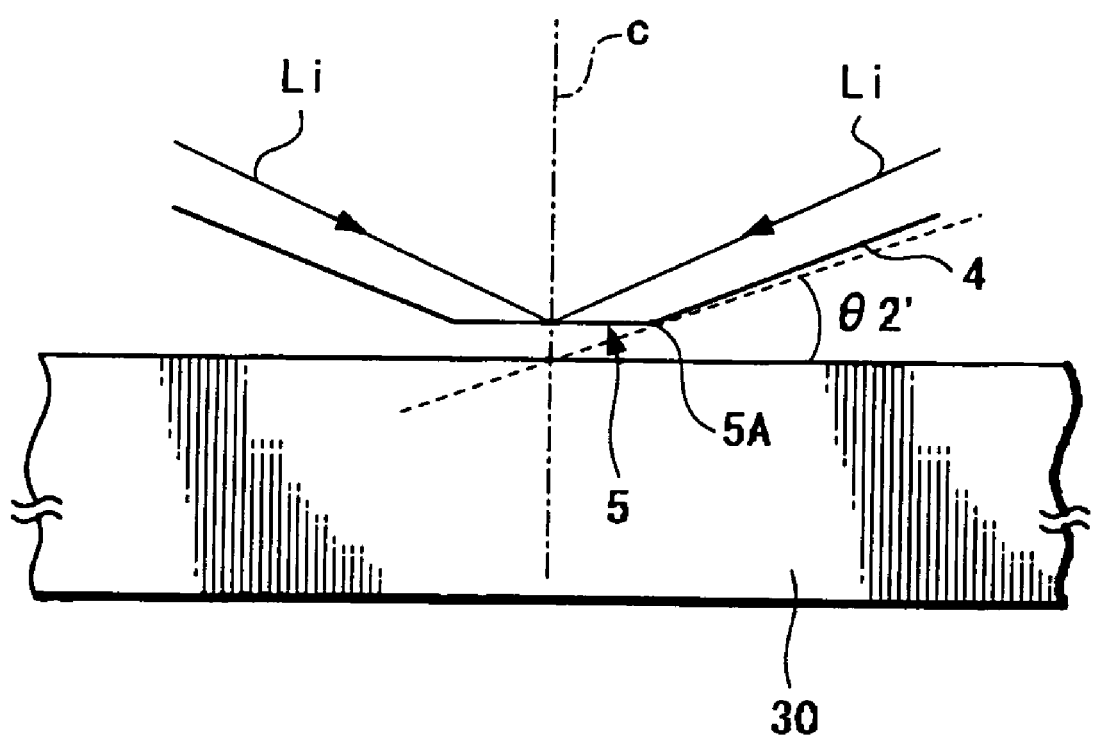
FIG. 24 is a schematic diagram showing an arrangement of a main portion of a comparative example of a solid immersion lens.

In each example, there is formed the solid immersion lens including a circular cone-like inclined portion 4 shown in FIGS. 22 to 24 and of which tip end portion is formed as the flat surface tip end portion. The tip end portion is etched and processed as a cylindrical shape by the FIB method and thereby the solid immersion lens having the convex portion 2 was formed. In FIGS. 22 and 23, elements and parts identical to those of FIG. 7 are denoted by identical reference numerals and therefore need not be described.

In this case, as FIG. 22 shows the manner in which the incident light 12 is introduced into the solid immersion lens, the tilt margin between the solid immersion lens and the optical recording medium 30 becomes an angle from the focused position on the surface of the optical recording medium 30 to the edge portion 5A of the tip end face 5. This angle is shown as θ2'.

Evaluated results of the tilt margins in the processed examples in which the tip end face is further processed from the arrangements shown in FIGS. 22 to 24 according to the arrangement of the present invention will be described below. In the respective examples which will be described below, the aforementioned shape shown in FIG. 16 was used as a processed example 1, the flat surface-like tip end face of the circular cone-like inclined portion was etched and processed progressively from its edge portion, and the solid immersion lens were formed while the length y, that is, height (etching depth) from the optical axis of the edge portion of the convex portion was being changed.

[1] INVENTIVE EXAMPLE 5 (PROCESSED EXAMPLES 1 TO 4)

First, in the inventive example 5, the lens material of the solid immersion lens was selected to be $Bi_4Ge_3O_{12}$ and a laser with a wavelength of 405 nm was used as an incident light source. Since the refractive index n of this lens material with respect to a wavelength of incident light is 2.213 and the incidence angel θi to obtain its maximum numerical aperture is 65.7°, 90°−θi becomes 24.3°.

In this case, in order to obtain a mechanical process margin, the inclination angel θs of the inclined portion was selected to be 19.3° while the incidence angle θi−5° was assumed. Thus, incident light can be reliably focused on the solid immersion lens without interrupting the incident light to obtain the maximum numerical aperture.

Then, in the state in which the etching depth is 0, that is, in the processed example 1, the length from the optical axis of the edge portion of the tip end face was 20 μm and the solid immersion lens of the comparative example 1 was formed. In this case, the tilt margin was +/−0.07°.

In the processed example 2, the solid immersion lens was formed such that the length from the optical axis of the edge portion 2A of the convex portion 2 was etched and processed to be 1.2μ and that the height h was etched and processed to be 0.42 μm. In this case, it becomes possible to enlarge the tilt margin between the solid immersion lens and the optical recording medium up to +/−1.19°.

Also, in the processed example 3, when the length y from the optical axis of the edge portion of the convex portion was selected to be 5.0 μm and the height h (etching depth) was selected to be 1.75 μm, it is possible to enlarge the tilt margin between the solid immersion lens and the optical recording medium up to +/−0.29°.

Further, in the processed example 4, when the length y from the optical axis of the edge portion of the convex portion was selected to be 10.0 μm and the height h was selected to be 3.15 μm, it is possible to enlarge the tilt margin between the solid immersion lens and the optical recording medium up to +/−0.14°.

The following table 3 shows the collections of the lengths y from the optical axis of the edge portion of the convex portion, the heights h and the tilt margins between the solid immersion lens and the optical recording medium in these processed examples 1 to 4. The length from the optical axis of the edge portion of the convex portion and the height can be freely selected depending on the process method, the process apparatus and the process time except the following combinations so long as the shape of the solid immersion lens can satisfy the above-described equations (2) and (3).

TABLE 3

| Inventive example 5 | Length y from optical axis of edge portion of tip end portion (μm) | Etching depth (height) h (μm) | Inclination margin angle between medium and lens (+/−deg) |
|---|---|---|---|
| Processed example 1 | 20.0 | — | 0.07 |
| Processed example 2 | 1.2 | 0.42 | 1.19 |
| Processed example 3 | 5.0 | 1.75 | 0.29 |
| Processed example 4 | 10.0 | 3.51 | 0.14 |

As is clear from the results on the table 3, the tilt margin between the solid immersion lens and the optical recording medium in the comparative example is +/0.07° and the tilt margins between the solid immersion lens and the optical recording medium in the inventive examples 1 to 3 exceed 0.10° and it is to be understood that the tilt margin is further increased as compared with that of the solid immersion lens of the processed example 1.

Figure 25:
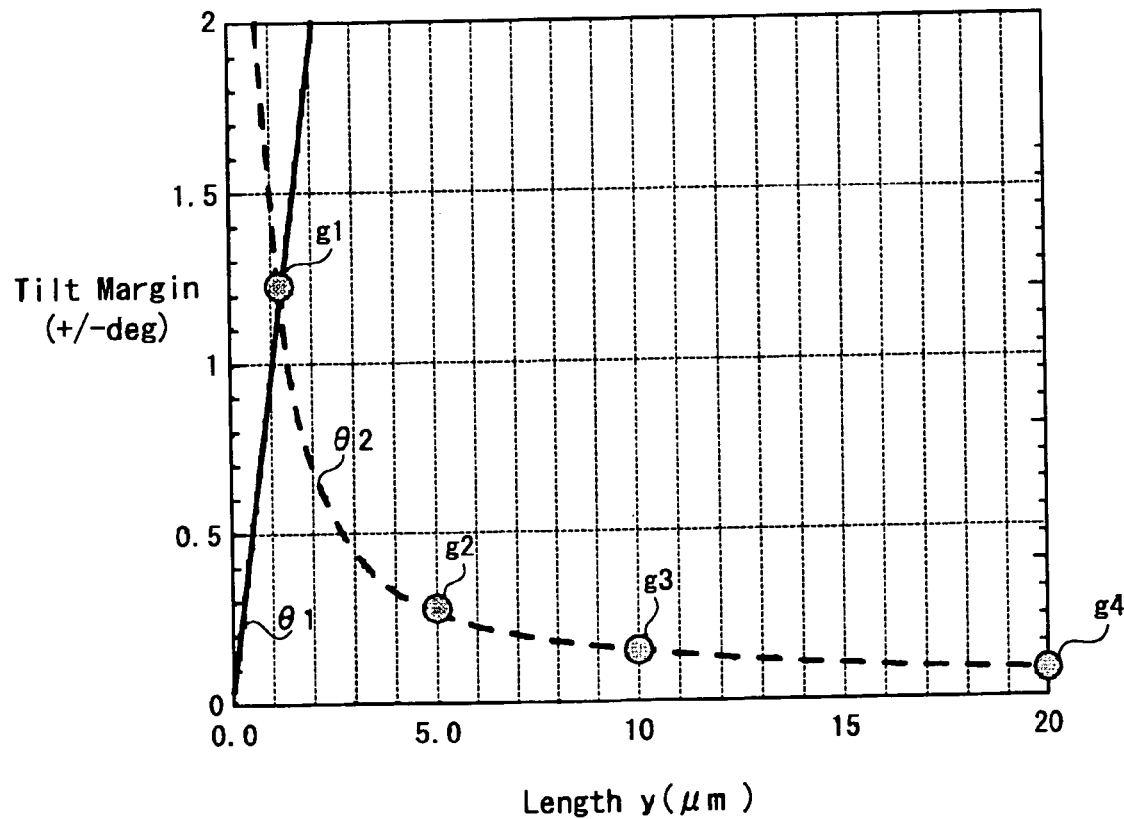
FIG. 25 is a diagram showing characteristic curves obtained when a tilt margin dependence of an example of a solid immersion lens relative to a length from an optical axis of a convex-like edge portion was measured.

Also, FIG. 25 shows dependences of the angles θ1 and θ2 from the focused position of the optical recording medium 30 to the convex portion and the edge portion of the inclined portion relative to the length y from the optical axis of the edge portion of the convex portion 2 in these respective examples. The height h of the convex portion 2 increases as the length y from the optical axis of the edge portion increases.

As it is clear from FIG. 25, while the angle θ1 increases monotonically as the length y from the optical axis of the convex portion 2 to the edge portion increases, the angle θ2 decreases in inverse proportion to the increase of the length y.

The tilt margin between the solid immersion lens and the optical recording medium depends on a smaller angle of these angles θ1 and θ2. Therefore, it is possible to maximize the tilt margin between the solid immersion lens and the optical recording medium by processing and forming the convex portion 2 having the shape satisfying θ1=θ2 as the objective surface.

When the shape of the convex portion 2 is selected so as to satisfy the above-described equations (2) and (3), these angles θ1 and θ2 can be increased to become larger than at least 0.10°. In particular, as in the above-described processed examples 2 to 4, the tilt margin is increased to become larger than 0.10°, whereby the solid immersion lens can be more reliably avoided from contacting with the optical recording medium. Thus, it is clear that there can be provided the solid immersion lens in which a margin of assembly accuracy relative to other optical assemblies, the lens holding member and the like can be increased as compared with the related art.

[2] INVENTIVE EXAMPLE 6 (PROCESSED EXAMPLES 1 to 3)

In this inventive example 6, the solid immersion lens was made of the material similar to that of the above-mentioned inventive example 5, its objective side was shaped as a circular cone and its objective surface was processed and formed as a flat surface. In this case, the radius of the flat surface portion of the tip end face (that is, length from the optical axis to the edge portion) was selected to be 50 μm.

With respect to this processed example 1, similarly to the above-mentioned inventive examples 2 to 4, the convex portion having the cylindrical shape was formed on the tip end portion by the FIB method.

In the processed example 2, the length y from the optical axis of the edge portion of the convex portion was selected to be 1.9 μm and the height h was selected to be 0.67 μm. In this case, the tilt margin between the solid immersion lens and the optical recording medium was +/−0.75°.

In the processed example 3, the length y from the optical axis of the edge portion of the convex portion was selected to be 10.0 μm and the height h was selected to be 3.51 μm. In this case, the tilt margin between the solid immersion lens and the optical recording medium was +/−0.14°.

The following table 4 shows the collection of the lengths y from the optical axis of the edge portion of the convex portion, the heights h and the tilt margins between the solid immersion lens and the optical recording medium in these processed examples 1 to 3.

TABLE 4

| Inventive example 6 | Length y from optical axis of edge portion of tip end portion (μm) | Etching depth (height) h (μm) | Inclination margin angle between medium and lens (+/−deg) |
|---|---|---|---|
| Processed example 1 | 50.0 | — | 0.03 |

TABLE 4-continued

| Inventive example 6 | Length y from optical axis of edge portion of tip end portion (μm) | Etching depth (height) h (μm) | Inclination margin angle between medium and lens (+/−deg) |
|---|---|---|---|
| Processed example 2 | 1.9 | 0.67 | 0.75 |
| Processed example 3 | 10.0 | 3.51 | 0.14 |

As is clear from the results on the table 4, the tilt margin between the solid immersion lens and the optical recording medium in the comparative example 2 is +/0.03° and the tilt margins between the solid immersion lens and the optical recording medium in the processed examples 2 and 3 exceed 0.10° and it is to be understood that the tilt margin is further increased as compared with that of the solid immersion lens of the processed example 1.

Figure 26:
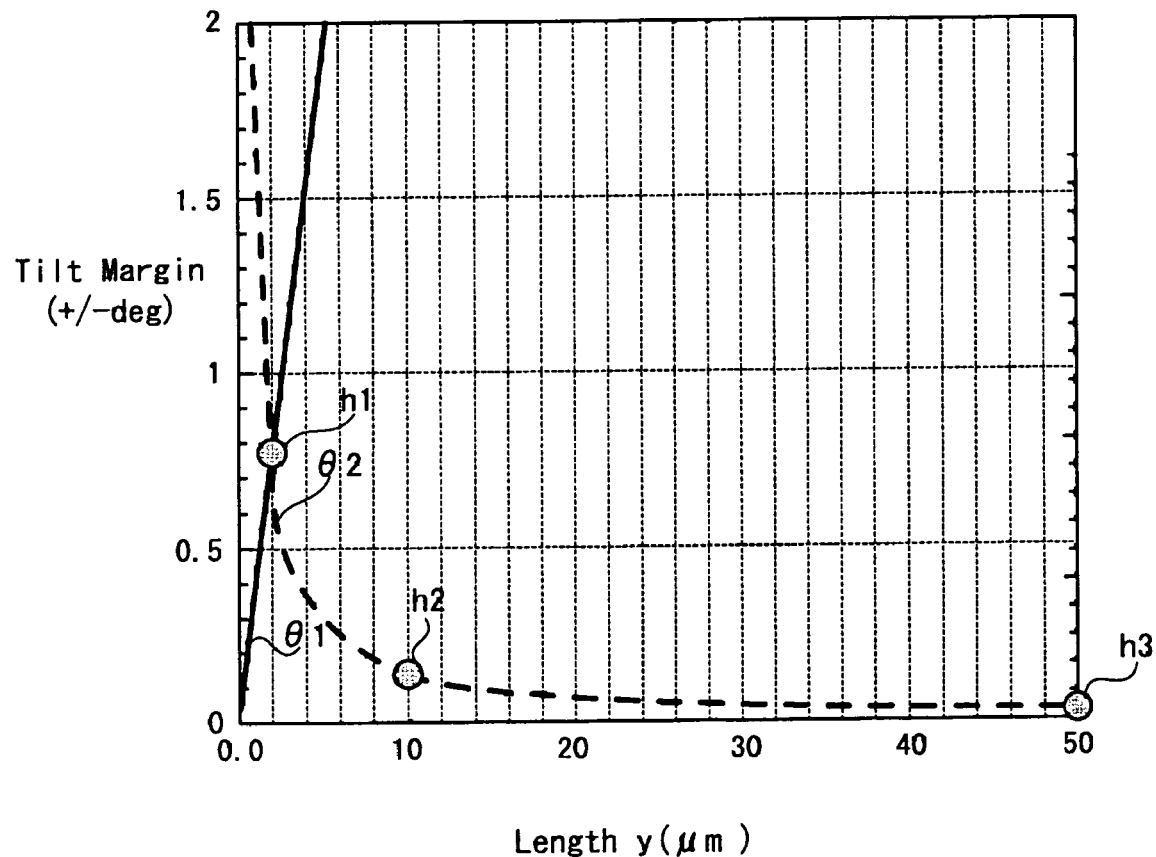
FIG. 26 is a diagram showing characteristic curves obtained when a tilt margin dependence of an example of a solid immersion lens relative to a length from an optical axis of a convex-like edge portion was measured.

Also, FIG. 26 shows dependences of the angles θ1 and θ2 from the focused position of the optical recording medium 30 to the convex portion and the edge portion of the inclined portion relative to the length y from the optical axis of the edge portion of the convex portion 2 in these respective examples.

As it is clear from FIG. 26, the angles θ1 and θ2 can both be increased to become larger than at least 0.10° and it is to be understood that the tilt margin can be reliably increased as compared with the comparative example 2.

[3] INVENTIVE EXAMPLE 7

Next, when S-LAH79, which is a high refractive index glass, was used as the material to construct the solid immersion lens, similarly to the aforementioned respective examples, the inclined portion having the circular cone shape was formed, the processed example 1 in which the objective surface was constructed as the flat surface was formed, the convex portion of its tip end portion was processed and formed by the FIB method and the tilt margin was evaluated. In this case, the radius of the objective surface in the processed example 1, that ism the distance from the optical axis of its edge portion was selected to be 20 μm. A tilt margin between the solid immersion lens and the optical recording medium obtained at that time is +/−0.07°.

In the processed example 2, the length y from the optical axis of the edge portion of the convex portion was selected to be 1.1 μm and the height h was selected to be 0.42 μm. The tilt margin between the solid immersion lens and the optical recording medium obtained at that time was +/−1.20°.

In the processed example 3, the length y from the optical axis of the edge portion of the convex portion was selected to be 5.0 μm and the height h was selected to be 1.90 μm. The tilt margin between the solid immersion lens and the optical recording medium obtained at that time was +/−1.29°.

In the processed example 4, the length y from the optical axis of the edge portion of the convex portion was selected to be 20.0 μm and the height h was selected to be 3.79 μm. The tilt margin between the solid immersion lens and the optical recording medium obtained at that time was +/−0.14°.

The following table 5 shows the collections of the lengths y from the optical axis of the edge portion of the convex portion, the heights h and the tilt margins between the solid immersion lens and the optical recording medium in these processed examples 1 to 4.

TABLE 5

| Inventive example 7 | Length y from optical axis of edge portion of tip end portion (μm) | Etching depth (height) h (μm) | Inclination margin angle between medium and lens (+/−deg) |
|---|---|---|---|
| Processed example 1 | 20.0 | — | 0.07 |
| Processed example 2 | 1.1 | 0.42 | 1.20 |
| Processed example 3 | 5.0 | 1.90 | 0.29 |
| Processed example 4 | 10.0 | 3.79 | 0.14 |

As is clear from the results on the table 5, the tilt margin between the solid immersion lens and the optical recording medium of the processed example 1 is +/−0.07° and the solid immersion lenses in the processed examples 2 to 4 have the tilt margins between them and the optical recording medium are larger than 0.10°. Thus, it is to be understood that their tilt margins are increased to become much larger as compared with the solid immersion lens of the processed example 1.

Figure 27:
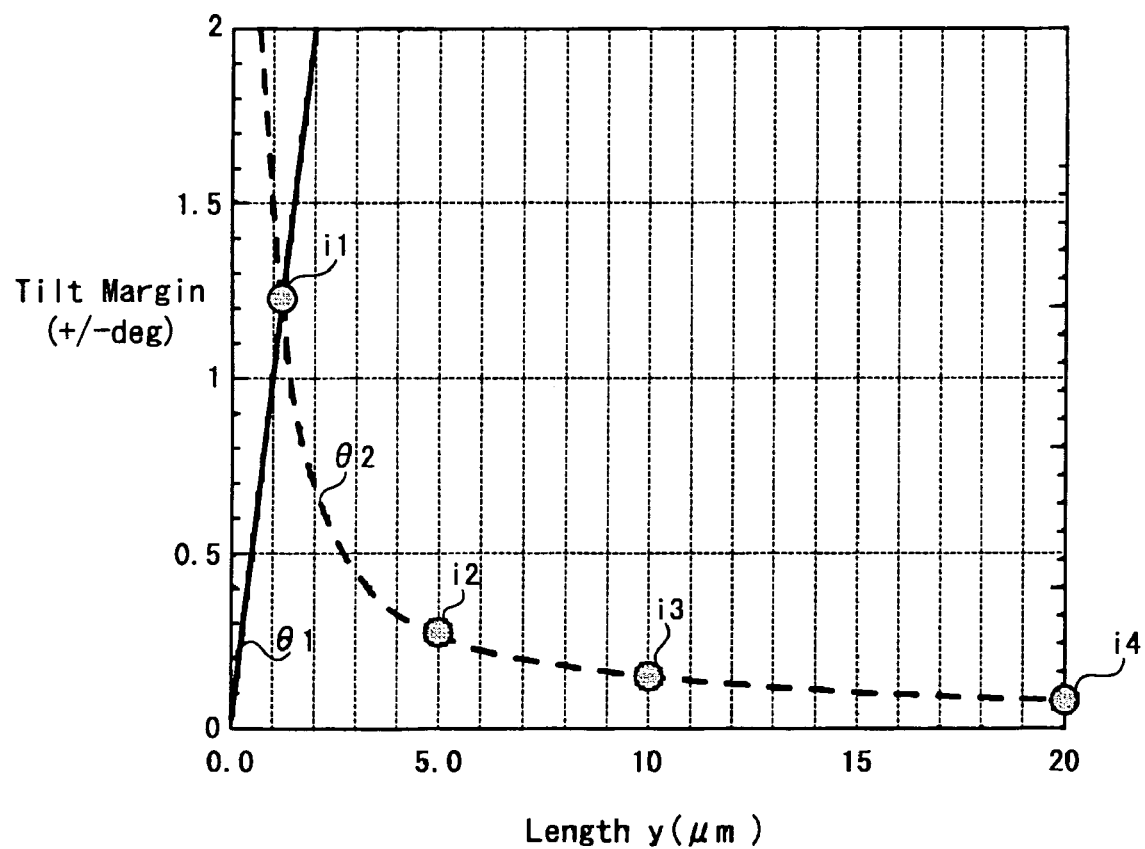
FIG. 27 is a diagram showing characteristic curves obtained when a tilt margin dependence of an example of a solid immersion lens relative to a length from an optical axis of a convex-like edge portion was measured.

Also, FIG. 27 shows dependences of the angles θ1 and θ2 from the focused position on the optical recording medium 30 to the convex portion and the inclined portion relative to the length y from the optical axis of the edge portion of the convex portion 2 in these respective examples.

As it is clear from FIG. 27, while the angles θ1 and θ2 in the processed examples 2 to 4 can both be increased to become larger than at least 0.10°, their tilt margins can be reliably increased as compared with the comparative example.

[4] INVENTIVE EXAMPLE 8

Next, the S-LAH79, which is the high refractive index glass, was used as the material to construct the solid immersion lens similarly to the above-mentioned third inventive example, the inclined portion having the circular cone shape was formed similarly to the aforementioned respective examples, the processed example 1 in which the objective surface was constructed as the flat surface was formed, the convex portion of its tip end portion was processed and formed by the FIB method and the tilt margin was evaluated. In this case, the radius of the objective surface in the comparative example 4, that is, the distance from the optical axis of its edge portion was selected to be 50 μm. The tilt margin between the solid immersion lens and the optical recording medium obtained at that time was +/−0.03°.

In the processed example 2, the length y from the optical axis of the edge portion of the convex portion was selected to be 1.8 μm and the height h was selected to be 0.68 μm. The tilt margin between the solid immersion lens and the optical recording medium obtained in this case was +/−0.78°.

In the processed example 3, the length y from the optical axis of the edge portion of the convex portion was selected to be 10.0 μm and the height h was selected to be 3.79 μm. The tilt margin between the solid immersion lens and the optical recording medium obtained in this case was +/−0.14°.

The following table 6 shows the collections of the length y from the optical axis of the edge portion of the convex portion, the length h and the tilt margins between the solid immersion lens and the optical recording medium in these processed examples 1 to 3.

TABLE 6

| Inventive example 8 | Length y from optical axis of edge portion of tip end portion (μm) | Etching depth (height) h (μm) | Inclination margin angle between medium and lens (+/−deg) |
|---|---|---|---|
| Processed example 1 | 50.0 | — | 0.03 |
| Processed example 2 | 1.8 | 0.68 | 0.78 |
| Processed example 3 | 10.0 | 3.79 | 0.14 |

As is clear from the results on this table 6, while the tilt margin between the solid immersion lens and the optical recording medium in the processed example 1 is +/−0.03°, the tilt margins between the solid immersion lens and the optical recording medium in the processed examples 2 and 3 are larger than 0.10° and it is to be understood that their tilt margins are increased to become much larger.

Figure 28:
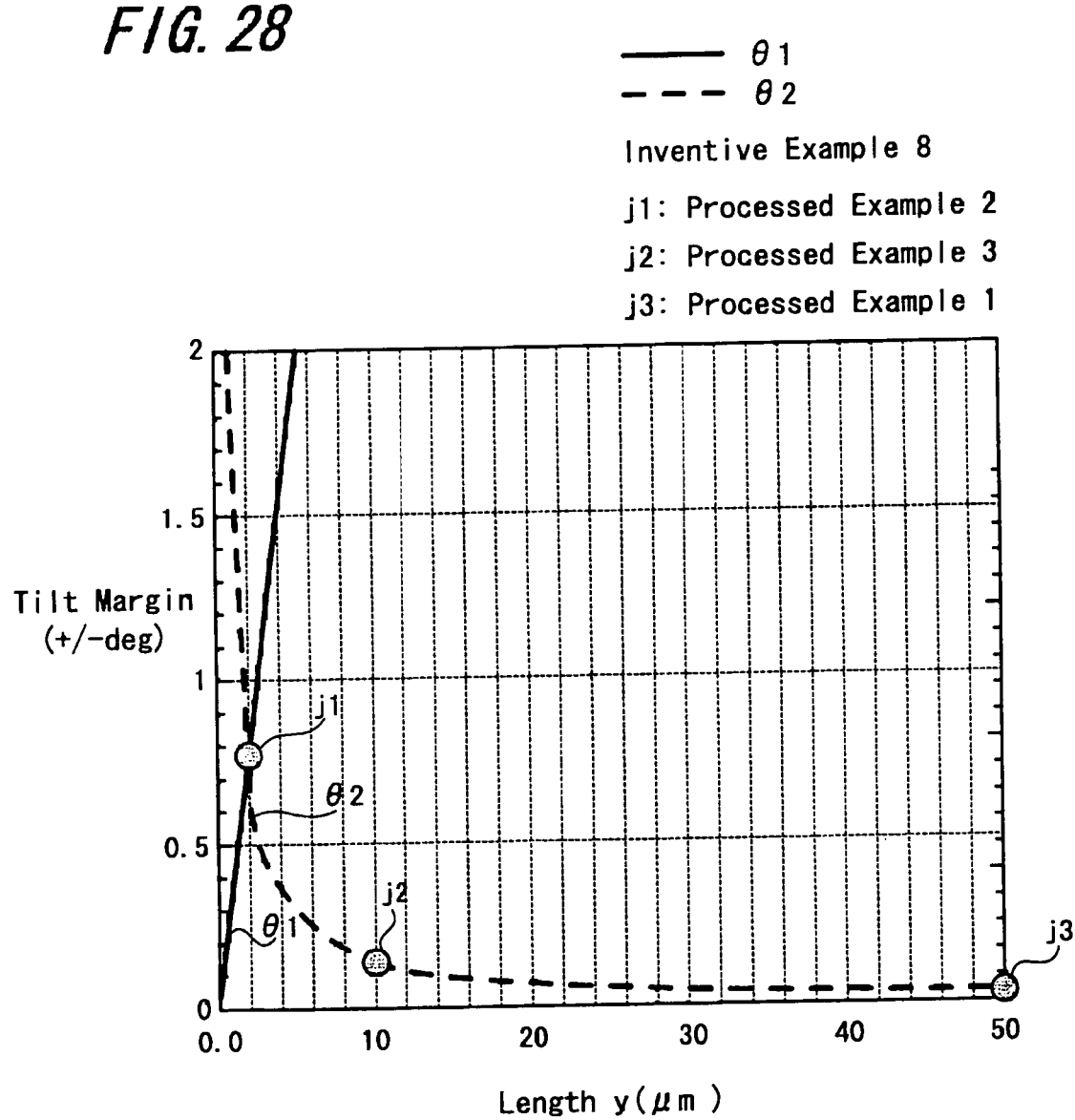
FIG. 28 is a diagram showing characteristic curves obtained when a tilt margin dependence of an example of a solid immersion lens relative to a length from an optical axis of a convex-like edge portion was measured.

FIG. 28 shows dependences of the angles θ1 and θ2 from the focused position on the optical recording medium 30 to the convex portion and the edge portion of the inclined portion relative to the length y from the optical axis of the edge portion of the convex portion 2.

From FIG. 28, it is to be understood that the angles θ1 and θ2 in the processed examples 2 and 3 can both be increased to become larger than at least 0.10° and that their tilt margins can be reliably be increased to be larger as compared with that of the processed example 1.

As it is clear from the processed example 1 in the above-mentioned respective inventive examples 5 to 8, it is difficult to establish the tilt margin between the solid immersion lens and the optical recording medium of larger than +/−0.10° by only processing the tip end side of the solid immersion lens as the circular cone shape. It is extremely difficult to further decrease the diameter of the tip end portion of the circular cone shape to thereby increase the tilt margin from an accuracy standpoint in the machine work.

On the other hand, the solid immersion lens having the arrangement according to the present invention has the convex portion formed at the tip end portion of the inclined portion and therefore it can be easily formed at excellent productivity. Further, as it is clear from the processed examples 2 to 4 in the above-mentioned inventive examples 5 to 8, it is to be understood that the tilt margin can be increased to become larger than 0.10° by properly selecting the shape of the tip end portion of the solid immersion lens.

Figure 29:
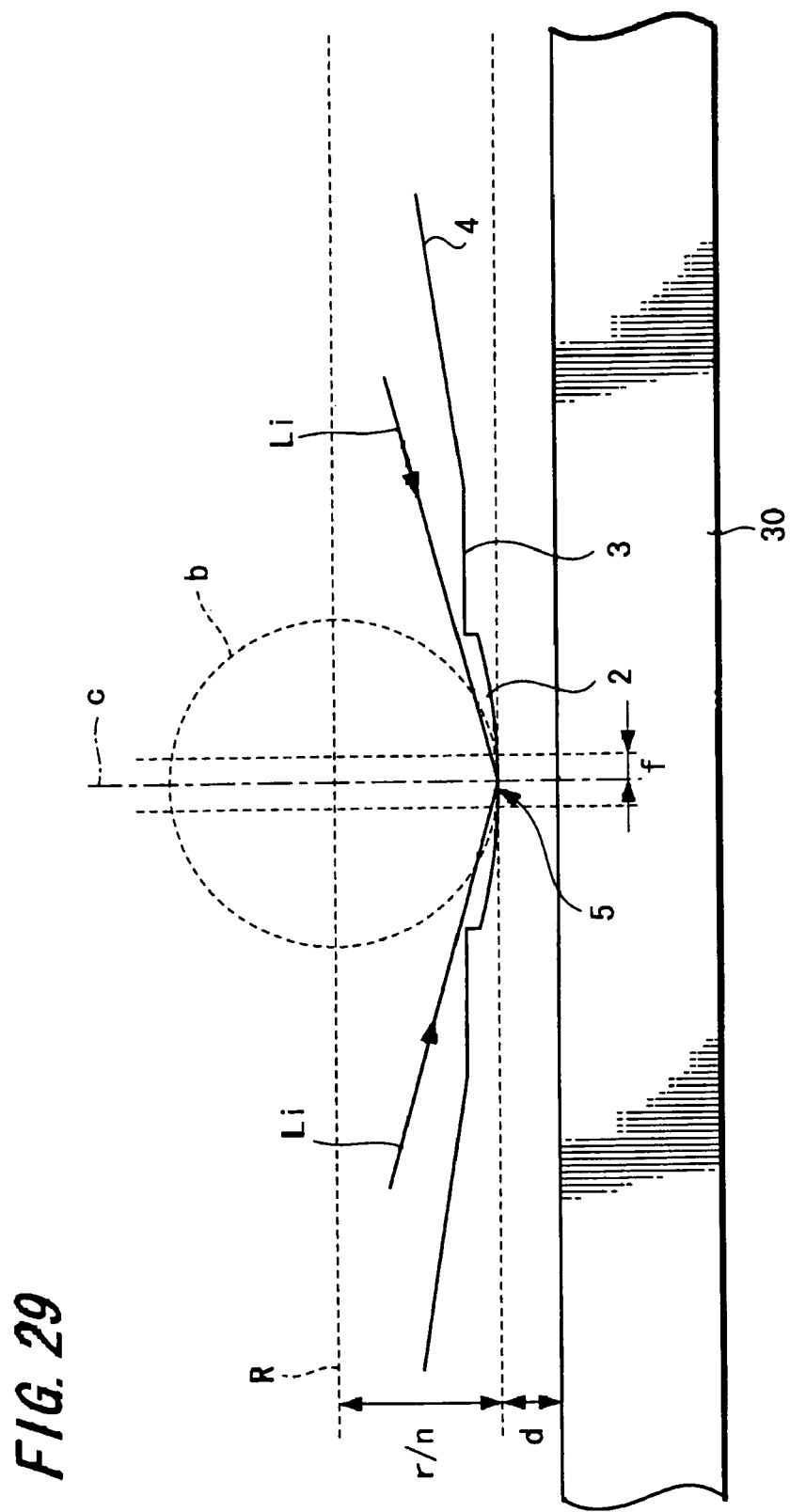
FIG. 29 is a schematic diagram showing an arrangement of a main portion of an example of a solid immersion lens according to the present invention.

Next, the arrangement of the solid immersion lens will be described in detail together with the light path of incident light with reference to schematic diagrams of the tip end portion of the solid immersion lens shown in FIGS. 29 and 30 as another embodiment of the present invention. In this case, the solid immersion lens 1 has its spherical portion shaped as a hemispherical portion or a hyper-hemispherical portion, although not shown. In this case, r assumes the radius of curvature of the spherical portion, n assumes the refractive index and the thickness of the direction extending along the optical axis assumes r when the spherical portion is shaped as the hemispherical portion, and the thickness of the direction extending along the optical axis assumes r (1+1/n) when the thickness of the direction extending along the optical axis is shaped as the hyper-hemispherical shape. Also, as shown in FIG. 29, the inclined portion 4 having the circular cone shape, for example, is provided on the objective side. The tip end side of the inclined portion has the annular flat surface portion 3, for example, which is nearly parallel to the flat surface perpendicular to the optical axis c similarly to the example that has been described with reference to FIG. 18, and the convex portion 2 having a suitable shape such as a cylindrical shape is formed on the inside thereof.

Then, in this example, the spherical portion is shaped as the hyper-hemispherical portion and its tip end face 5 is formed as a shape which substantially circumscribes a sphere (shown by a broken line b) of which the radius is approximately r/n. When the spherical portion 1 is formed as the hemispherical portion, its tip end face 5 is formed as a shape which substantially circumscribes a sphere of which diameter is substantially r. In FIGS. 29 and 30, elements and parts identical to those of FIG. 7 and FIGS. 18 to 20 are denoted by identical reference numerals and therefore need not be described.

As shown in FIG. 29, an area in which the tip end face 5 circumscribes the sphere with the radius of substantially r/n shown by the broken line b becomes an area with a radius f, for example.

In this arrangement, when the optical axis of incident light Li to obtain the maximum numerical aperture is displaced as shown by arrows Li1 and Li2 in FIG. 28, in this area with the radius f, incident light can be reliably focused on the tip end face 5 of the convex portion 2 which is the objective surface. This relationship may apply for the case in which the spherical portion is formed as the hemispherical portion as well.

Having considered that this radius f falls within a range of from +/−0.5° to 5° considering the displacement angle of the optical axis of incident light, for example, when the radius of the spherical portion is selected to be about 0.5 mm, for example, it is considered that the radius f can fall within a range of from approximately 5 μm to 50 μm.

Also, when the radius of the sphere shown by the broken line b is slightly shifted from r/n or the spherical portion is formed as a curved surface which circumscribes this sphere with a very small displacement, if such displacement falls within a range that can be corrected by the optical system on the side from which light is introduced into the solid immersion lens, a similar margin for the inclination of the incidence angle can be obtained. This relationship may apply for the case in which the spherical portion is formed as a hemispherical portion as well.

According to this arrangement, even when the incident light to obtain the maximum numerical aperture is introduced into the solid immersion lens with its optical axis displaced, the incident light can be focused on the objective surface and it can be irradiated on the optical recording medium without changing the length of the light path through which incident light is passed through the solid immersion lens 11.

Accordingly, also in the assembly process with an optical lens and in the bonding process, a margin for alignment accuracy can be increased as compared with the related art. Thus, even when a solid immersion lens with a ultra-small diameter that has been difficult to be produced is in use, it becomes possible to assemble and manufacture the above ultra-small diameter solid immersion lens easier than the related art together with the above-mentioned effect in which the tilt margin with the optical recording medium can be increased.

As described above, the process for enabling the tip end face 5 of the solid immersion lens 11 to circumscribe with the sphere with the radius of approximately r/n or to substantially circumscribe the sphere with the radius of approximately r can be applied to the case in which the convex portion is not provided on the objective side. Also in this case, it is possible to obtain the tilt margin for the incident light similarly.

An example of a method for forming a solid immersion lens having such tip end face shape will be described with reference to process diagrams of FIGS. 31A to 31C.

Figure 31A:
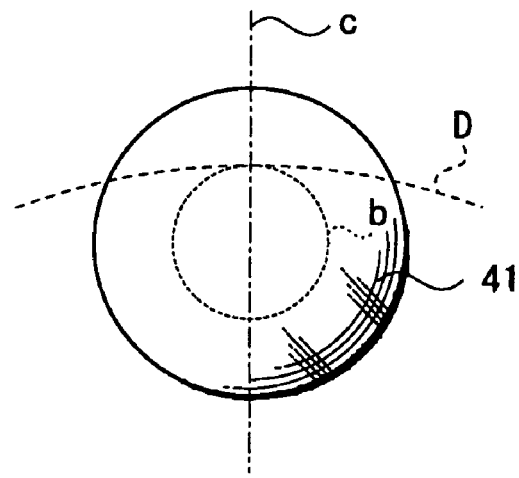
FIG. 31A is a process diagram showing an example of a method for forming a solid immersion lens according to the present invention.

First, as shown in FIG. 31A, an approximately ball-like lens material body 41 with a radius of curvature r, for example, is formed by using a material having a refractive index n. Then, the objective side of the lens material body 41 is processed and formed as a curved surface by a suitable method such as a machine work as shown by a broken line D in such a manner that it may circumscribe a sphere with a radius of approximately r/n and of which center is coincident with the central position as shown by a broken line b.

Figure 31B:
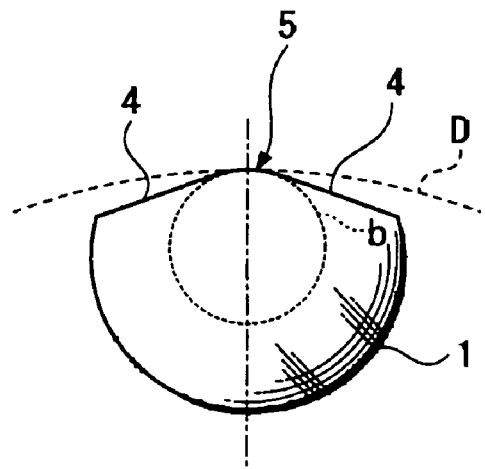
FIG. 31B is a process diagram showing an example of a method for forming a solid immersion lens according to the present invention.

Then, as shown in FIG. 31B, the circumference of the tip end face 5 having the shape which nearly circumscribes the thus formed sphere with the radius of substantially r/n is processed as a circular cone shape, for example, by a suitable method such as a machine work and thereby the inclined portion 4 is formed.

Figure 30:
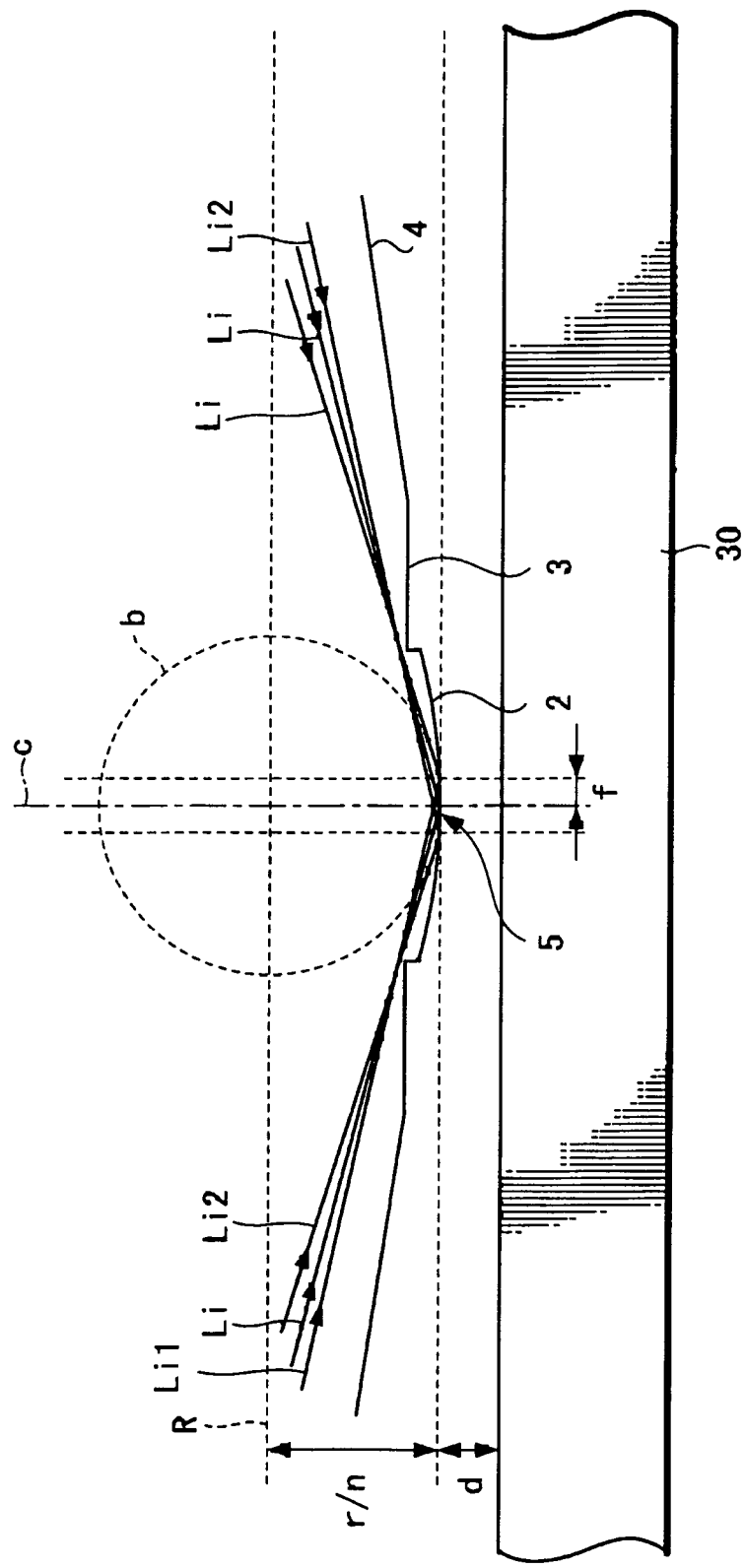
FIG. 30 is a schematic diagram showing an arrangement of a main portion of an example of a solid immersion lens according to the present invention.
Figure 31C:
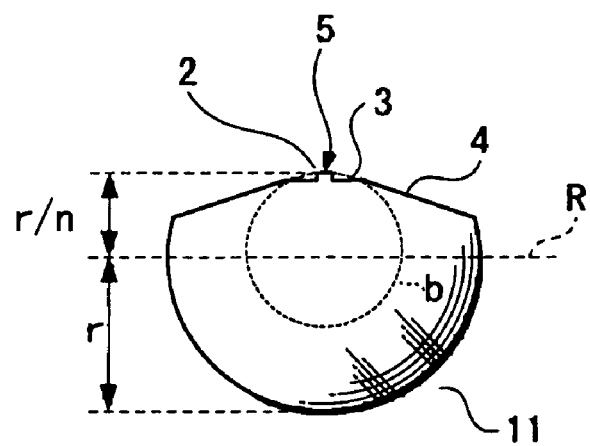
FIG. 31C is a process diagram showing an example of a method for forming a solid immersion lens according to the present invention.

After that, as shown in FIG. 31C, the convex portion 2 is formed by etching and processing the circumference of the tip end face 5 according to a suitable method such as the FIB method and thereby the solid immersion lens having the aforementioned shapes shown in FIGS. 29 and 30 can be formed.

As described above, if the shape of the solid immersion lens according to the present invention is used, then it becomes possible to avoid the light path of the incident light to obtain the high numerical aperture from being interrupted positively. Also, if the tilt margin between the solid immersion lens and the optical recording medium is increased, then it becomes possible to easily and stably assemble the solid immersion lens with the high numerical aperture into the condensing lens. Further, the process and assembly of the solid immersion lens can be made easy and the diameter of the lens can be decreased.

Accordingly, if the solid immersion lens having the arrangement according to the present invention is used, then it is possible to construct a condensing lens with a smaller diameter as compared with the related art. In a pickup device having this condensing lens assembled thereto, since an optical lens is miniaturized, servo characteristics such as focusing servo, tracking servo and a seek time can be improved. Thus, it becomes possible to increase stability of recording and reproduction relative to optical recording medium/magneto-optical recording medium. Therefore, it becomes possible to make the optical pickup device and the optical recording and reproducing apparatus small in size, thin in thickness and high in performance.

The solid immersion lens according to the present invention is not limited to the above-mentioned respective examples and it can adopt other shapes without departing from the arrangement of the present invention.

FIG. 32 and FIGS. 33 to 40 are schematic diagrams showing the tip end portion of the solid immersion lens in an enlarged-scale. As shown in FIG. 32 and FIGS. 33 to 40, the shape of the convex portion and the shape of the circumference of the convex portion can be etched and processed variously by the FIB method, for example. In FIGS. 1A and 1B and FIGS. 33 to 40, elements and part identical to those of FIG. 29 can be denoted by identical reference numerals and therefore need not be described.

Figure 32:
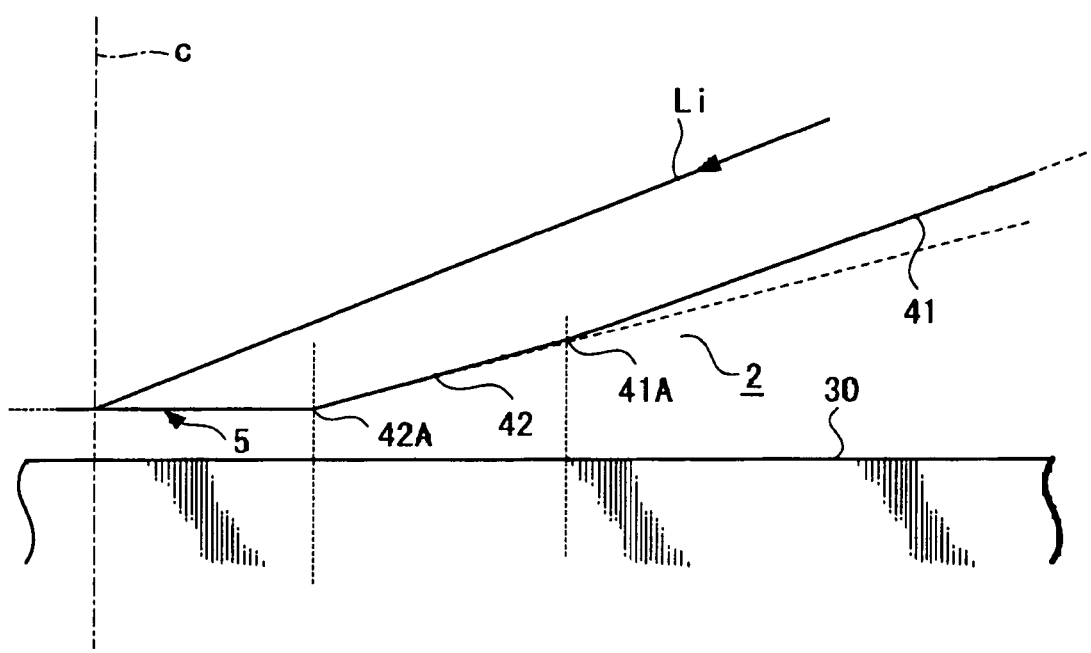
FIG. 32 is a schematic diagram showing an arrangement of a main portion of an example of a solid immersion lens according to the present invention.

That is, in the example shown in FIG. 32, for example, there is shown the case in which the inclined portion of the convex portion 2 is composed of first and second inclined portions 41 and 42 which are inclined stepwise from the outer peripheral side to the tip end face 5. Also in this case, it is possible to avoid incident light from being affected by properly selecting distances and inclination angles from the optical axis c of respective edge portions 41A and 42A of the first and second inclined portions 41 and 42.

Figure 41A:
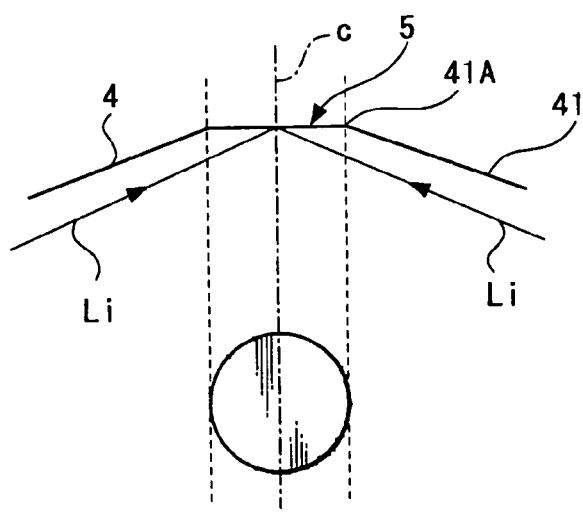
FIG. 41A is a process diagram showing an example of a method for forming a solid immersion lens according to the present invention.
Figure 41B:
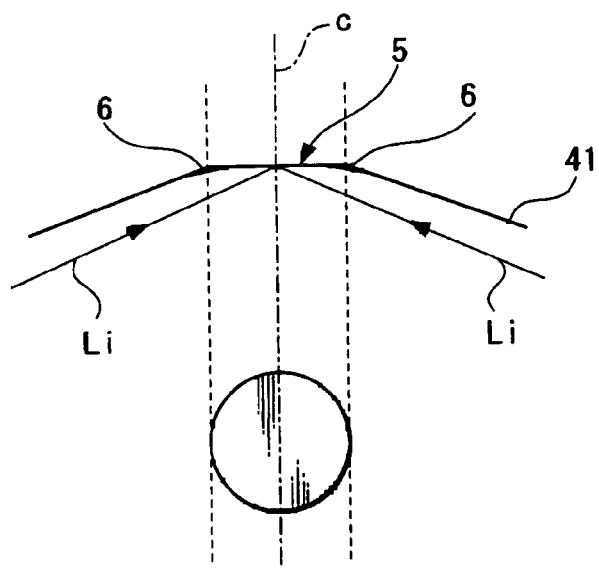
FIG. 41B is a process diagram showing an example of a method for forming a solid immersion lens according to the present invention.
Figure 41C:
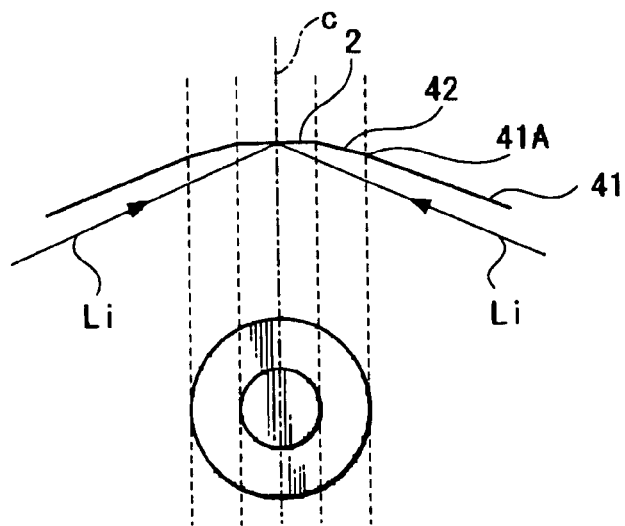
FIG. 41C is a process diagram showing an example of a method for forming a solid immersion lens according to the present invention.

FIGS. 41A to 41C are process diagrams showing side views and plan views of the arrangements obtained during the process in which the portions near the tip end face of the solid immersion lens are formed. In this case, as shown in FIG. 41A, for example, when the first inclined portion 41 having a suitable shape such as a circular cone and a pyramid was processed and formed, the etching processed portion 6 is scraped away by an etching method such as the FIB method so that the edge portion 41A between the tip end face 5 and the first inclined surface 41A may be obliquely scraped away. Thus, as shown in FIG. 41C, it is possible to easily obtain the convex portion 2 in which the first inclined portions 41 and 42 can be formed from the outer peripheral side to the optical axis c.

Figure 33:
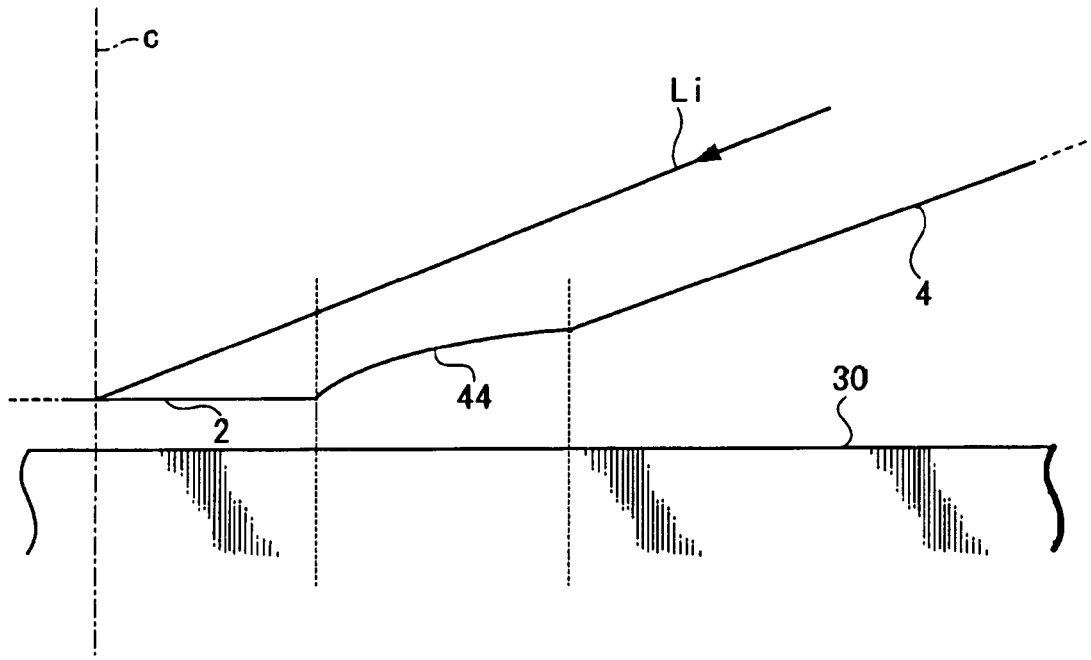
FIGS. 33 to 40 are schematic diagrams each showing arrangements of main portions of examples of solid immersion lenses according to the present invention, respectively.
Figure 34:
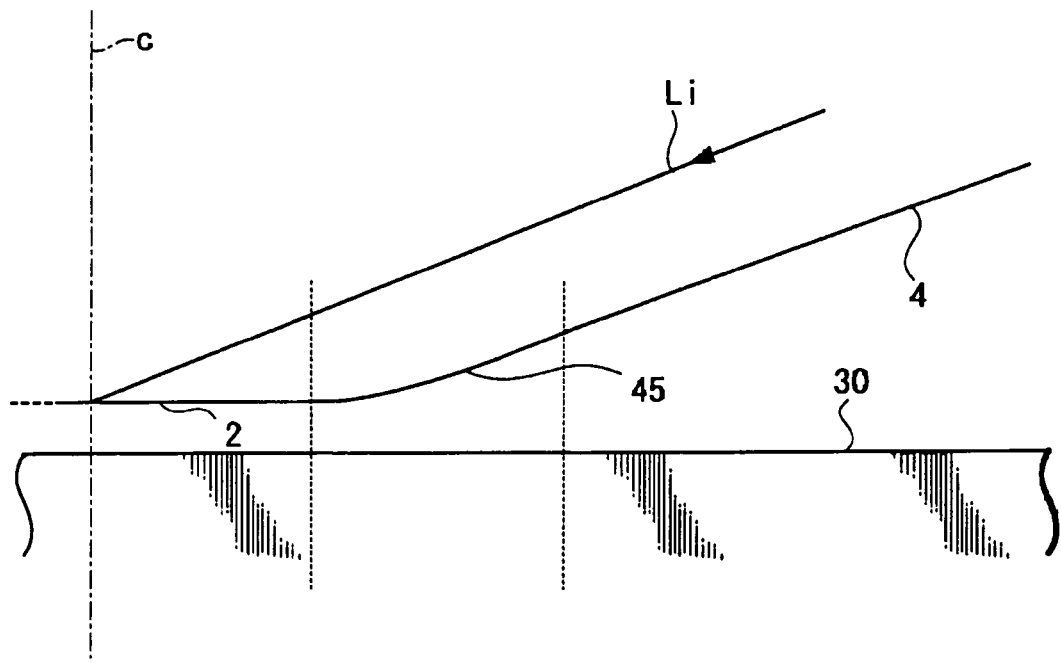

Also, as shown in FIG. 33, a concave curved surface 44 can be formed around the tip end face of the convex portion 2. Alternatively, as shown in FIG. 34, a convex curved surface portion 45 can be formed around the tip end face of the convex portion 2.

Figure 35:
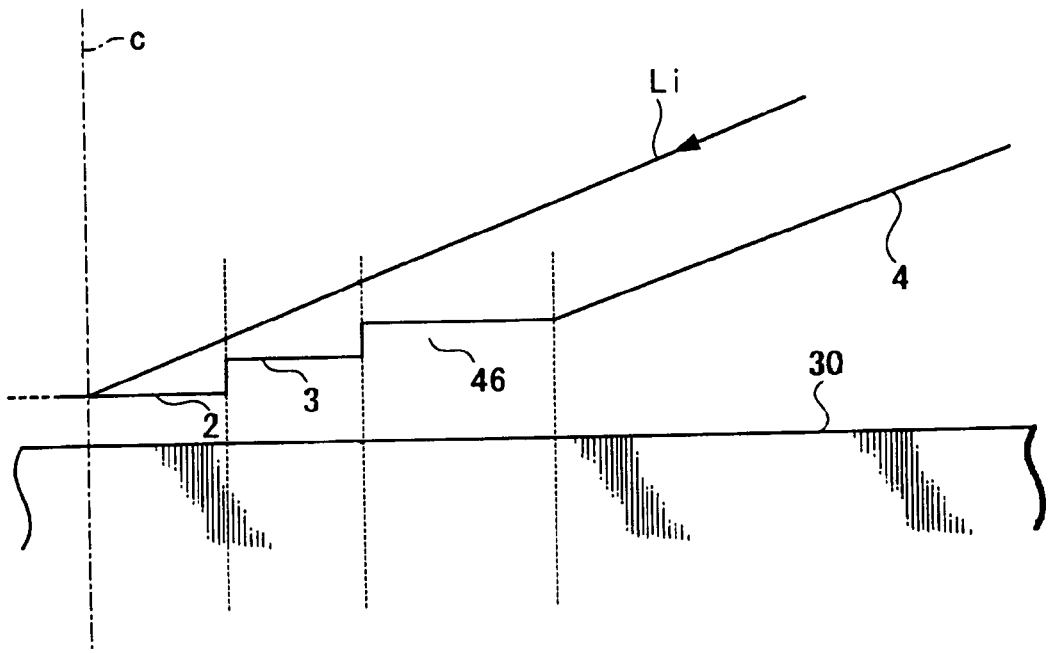

Further, as shown in FIG. 35, the flat surface portion 3 can be formed around the convex portion 2 having a suitable shape such as a circular cylinder or a prism. Further, a stepped portion 46 can be formed around the flat surface portion 3.

Figure 36:
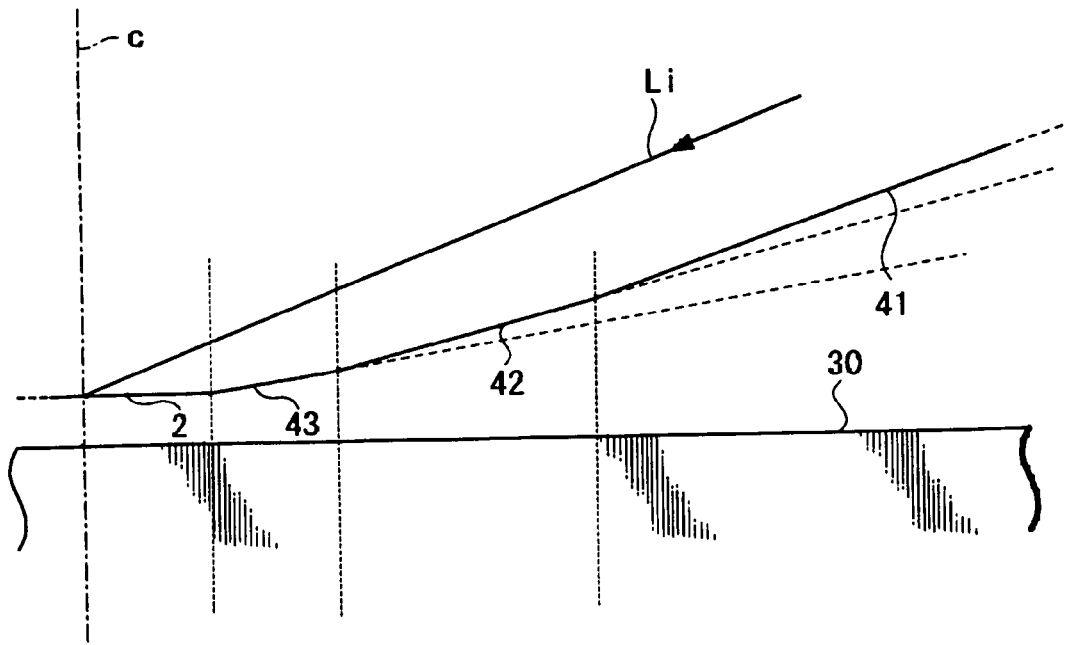

Furthermore, as shown in FIG. 36, inclined portions having suitable shapes such as circular cones and pyramids of which angles are changed stepwise may be provided around the convex portion 2 and thereby first to third inclined portions 41 to 43 can be constructed.

Figure 37:
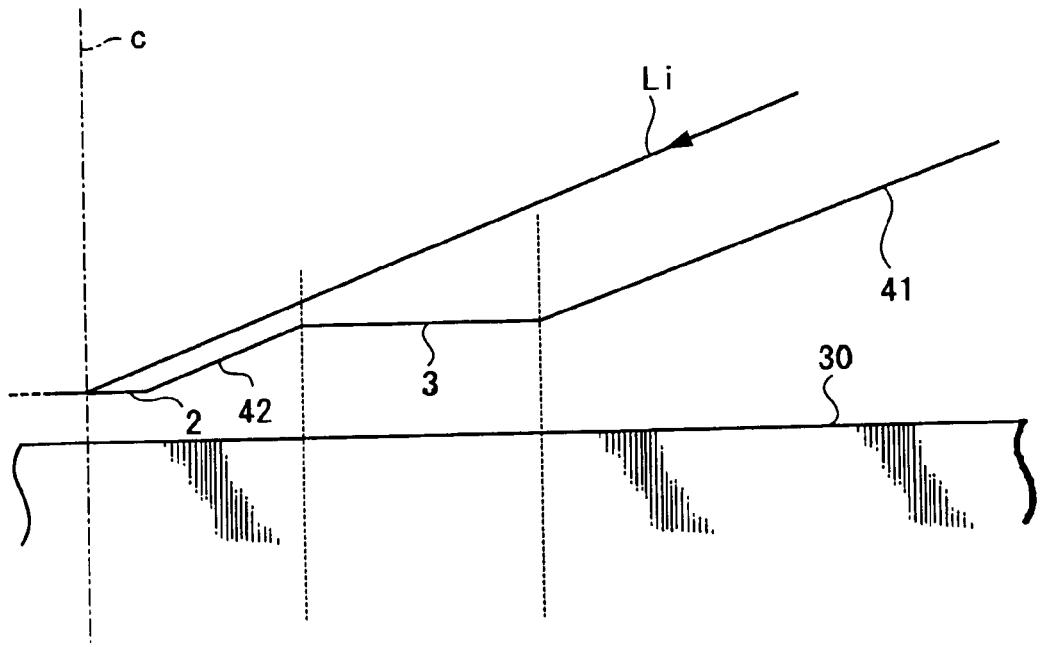
Figure 38:
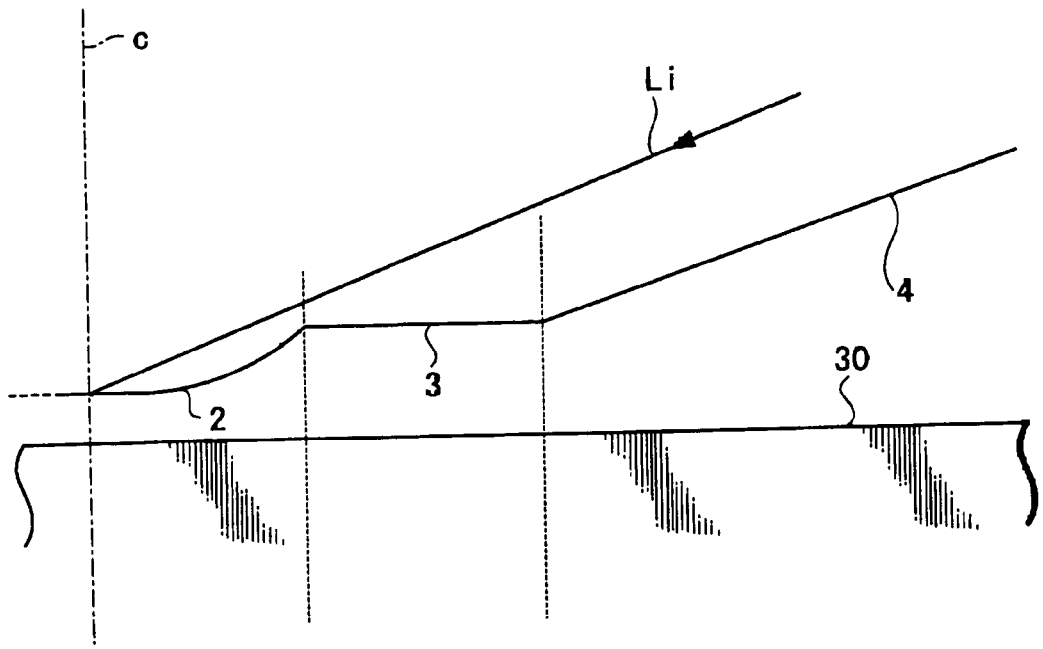
Figure 39:
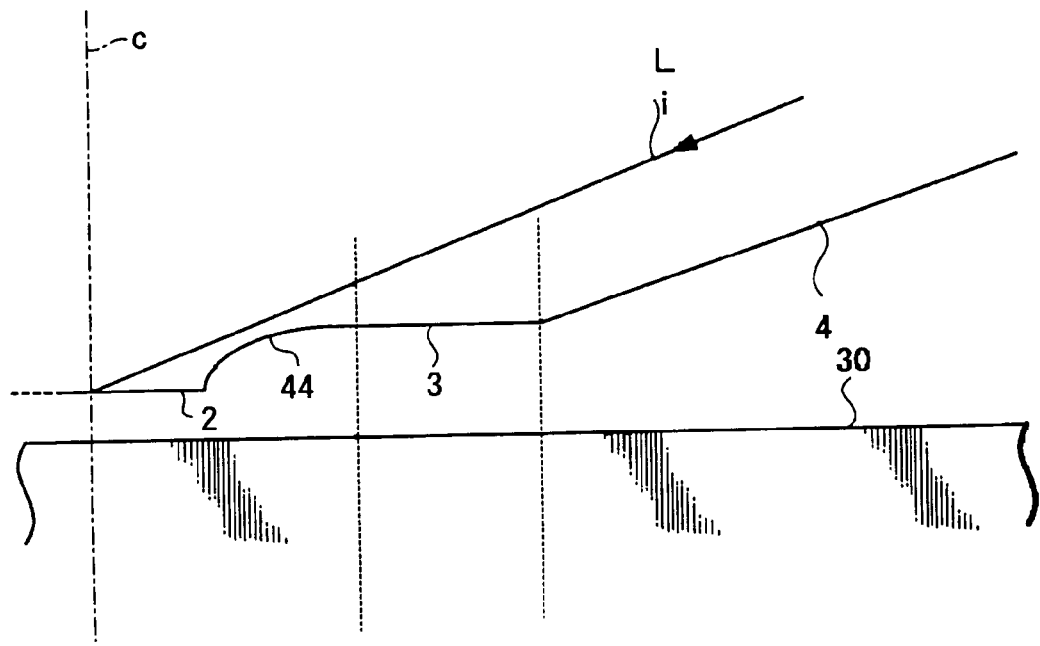

In addition, the solid immersion lens can take various shapes in such a manner that the first and second inclined portions 41 and 42 may be provided and that the flat surface portion 3 substantially perpendicular to the optical axis c may be provided between these inclined portions 41 and 42 as shown in FIG. 37 or in such a manner that the tip end of the convex portion 2 may be formed as a convex curved surface as shown in FIG. 38 or in such a manner that the circumference of the convex portion 2 having a suitable shape such as a circular cylinder and a prism may be formed as a concave curved surface portion 44 as shown in FIG. 39.

Figure 40:
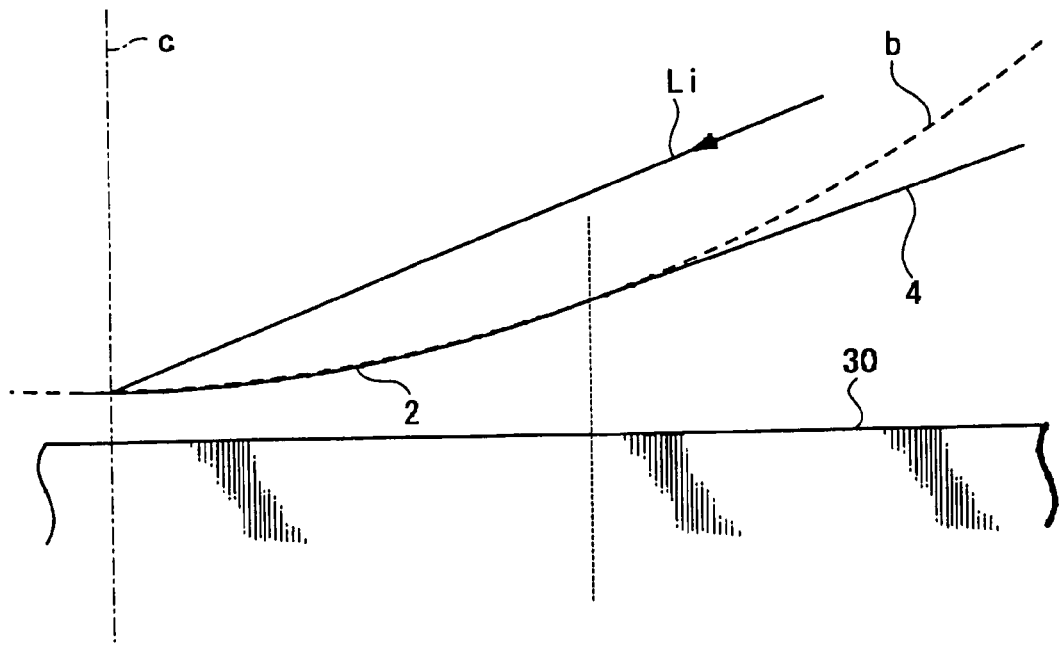
Figure 42A:
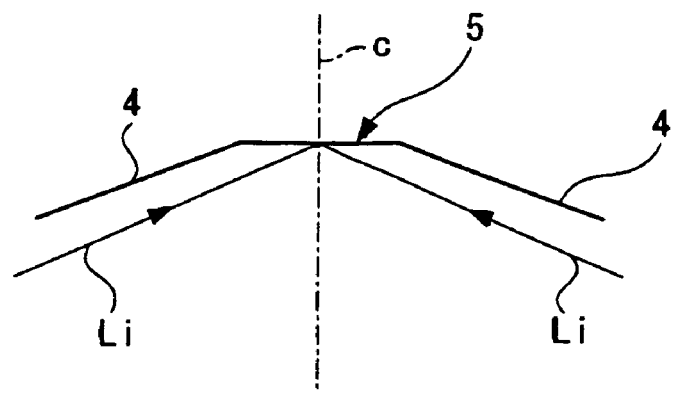
FIG. 42A is a process diagram showing an example of a method for forming a solid immersion lens according to the present invention.
Figure 42B:
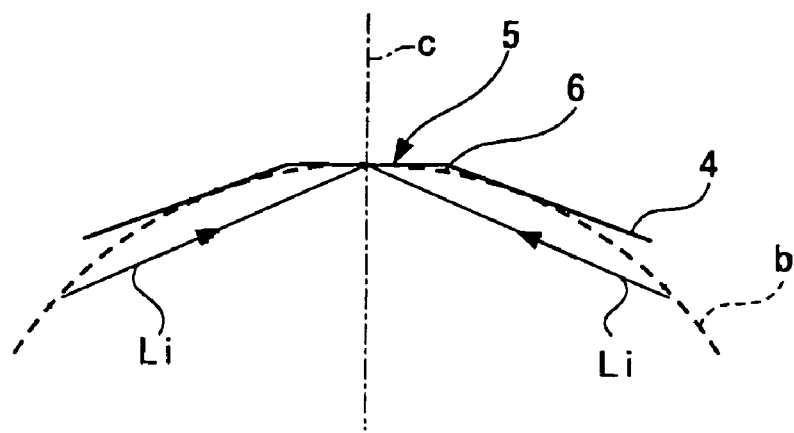
FIG. 42B is a process diagram showing an example of a method for forming a solid immersion lens according to the present invention.
Figure 42C:
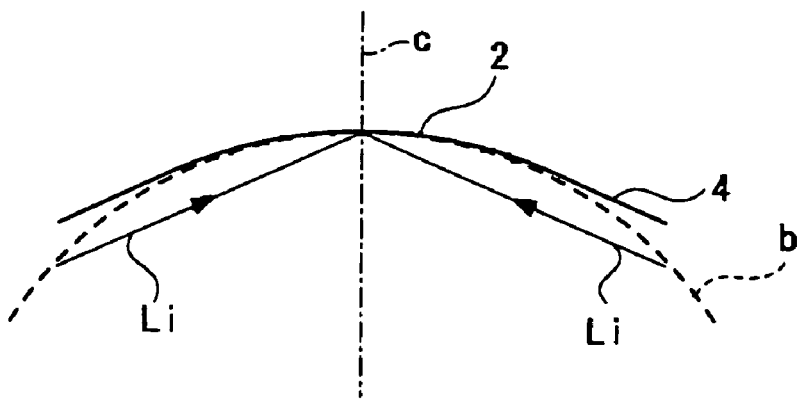
FIG. 42C is a process diagram showing an example of a method for forming a solid immersion lens according to the present invention.

Also, as shown in FIG. 40, the convex portion 2 can be formed as a curved surface which substantially circumscribes the sphere with the radius of approximately r/n as shown by the broken line b (when the spherical portion is the hemispherical portion, the curved surface will circumscribe a sphere with a diameter of substantially r). A method for forming a solid immersion lens having such convex portion will be described. As shown in FIG. 42A, for example, after the inclined portion 4 having the circular cone shape and the tip end face 5 having the flat surface, for example, were formed by a suitable method such as a machine work, as shown in FIG. 42B, a part of the tip end face 5 is etched and processed as a curved surface by a suitable method such as the FIB method. Then, the convex portion 2 which substantially circumscribes the sphere with the radius of approximately r/n may be formed as shown in FIG. 42C by removing the etching processed portion 6 such that it may substantially circumscribe the spherical surface shown by the broken line b.

In addition to the examples that have been described so far, in the solid immersion lens according to the present invention, the shapes of the convex portions having the above-mentioned arrangements and the shapes of the inclined portions may be a symmetrical shape of revolution which is rotated around the optical axis c used as an axis of revolution or other asymmetrical shapes.

In particular, when the present invention is applied to a condensing lens, an optical pickup device and an optical recording and reproducing apparatus of which target medium is a disc-like optical recording medium, it is desired that the convex portion should be shaped so as to further increase the tilt margin of the direction in which the disc-like recording medium tends to incline, that is, the radius direction. Specifically, when the convex portion 2 having the cylindrical shape, for example, is provided, the convex portion 2 may have the cross-section, perpendicular to the optical axis, formed as a suitable shape such as a square, a rectangle and an ellipse. When the cross-section of the convex portion 2 is formed as the ellipse, for example, its minor-axis direction may be set to a so-called radial direction which is the radius direction of the disc so that the tilt margin can be increased more in the so-called radial direction, which is the radius direction, as compared with the so-called tangential direction which is the tangential direction of the recording track of the disc.

Also, in the solid immersion lens according to the present invention, when the convex portion is formed as a shape which substantially circumscribes the sphere with the radius of approximately r/n (sphere with a diameter of approximately r when the spherical portion is formed as the hemispherical portion), as described above, if the central position of the sphere with the radius of r/n, for example, is slightly shifted from the central position of the spherical portion or when the convex portion is formed as a shape which circumscribes a sphere with a radius slightly shifted from r/n, effects of the present invention can be achieved so long as the above displacements can be corrected by the optical system on the light incident side. Thus, it is needless to say that the shape of the tip end portion can be selected variously.

In the shapes of the respective tip end portions, the tip end portion can be formed as the shape which may not disturb the incident light to obtain the maximum numerical aperture by properly selecting the angles and lengths of the convex portion and the inclined portion.

In the materials and arrangements of the solid immersion lens including other portions, it is needless to say that the present invention is not limited to the above-mentioned examples and that it can be changed and modified variously.

In the above-mentioned solid immersion lens according to the present invention, the inclined portion is formed at least on a part thereof from the tip end portion of the objective side to the spherical portion and the inclination angel θ from the optical axis of the inclined portion is selected to satisfy:

$$\theta \geq \theta i$$

where θi represents the angle of incidence of light introduced into the solid immersion lens. Hence, the incident light can be reliably focused on the tip end portion and a bonding area of the solid immersion lens to the holding member can be maintained and thus the solid immersion lens can be held by the holding member more stably.

Also, in the above-mentioned solid immersion lens, since the convex portion is provided on the tip end portion of the inclined portion so as to protrude in the objective side, the objective surface of the convex portion can be formed as the very small area and the tilt margin between the solid immersion lens and the optical recording medium and the like can be increased as compared with the related art. Further, since a processed volume obtained when this convex portion is formed becomes small as compared with a processed volume obtained when a circular cone shape is formed, when only the convex portion is processed and formed by a suitable method such as a semiconductor process technology, it becomes possible to form the objective surface of small area as compared with the case in which only the convex portion is processed and formed by only the related-art mechanical process. Thus, it becomes possible to reduce the diameter of the solid immersion lens itself.

Also, in the solid immersion lens according to the present invention, when the solid immersion lens is formed so as to satisfy the above-described equations (1) to (3), incident light can be focused on the objective surface while the incident light of angle of incidence to obtain the maximum numerical aperture can be reliably prevented from being interrupted. Also, the tilt margin can be reliably increased to become larger than 0.10° and the tilt margin between the objective surface and the optical recording medium can be increased as compared with the related-art solid immersion lens. In addition, it becomes possible to easily provide the solid immersion lens by which the maximum numerical aperture can be obtained.

Further, in the solid immersion lens according to the present invention, when its tip end portion is formed as the shape which substantially circumscribes the sphere with the diameter of approximately r if the spherical portion is the hemispherical portion or when its tip end portion is formed as the shape which substantially circumscribes the sphere with the radius of approximately r/n if the spherical portion is the hyper-hemispherical portion, the solid immersion lens can have the permissible range relative to the displacement of the optical axis of the incident light, and both of the tilt margin between this solid immersion lens and the object such as the optical recording medium and the assembly accuracy margin between this solid immersion lens and other optical lens can be increased. Thus, it is possible to easily obtain the solid immersion lens with the large numerical aperture.

Then, according to the condensing lens using the solid immersion lens having the above-mentioned arrangement -of the present invention, since the tilt margin between the solid immersion lens and the optical recording medium and the like can be increased as compared with the related art, the assembly accuracy of the condensing lens relative to the optical lens can be increased, and hence it becomes possible to assemble the condensing lens with the large numerical aperture more easily as compared with the related art.

Also, in the optical pickup device and the optical recording and reproducing apparatus constructed by using this condensing lens, the tilt margin between the solid immersion lens and the optical recording medium can be increased, incident light to obtain the maximum numerical aperture of the lens can be focused reliably and its assembly accuracy margin can be increased as compared with the related art.

Then, since the diameter of the solid immersion lens also can be reduced, in the optical pickup device and the optical recording and reproducing apparatus constructed by using this condensing lens, it becomes possible to stably control the condensing lens which is moved in the focusing direction of the optical recording medium or in the tracking direction of the optical recording medium. Furthermore, it becomes possible to improve servo characteristics such as focusing servo, tracking servo and the seek time.

Also, according to the method for forming the solid immersion lens of the present invention, since this forming method comprises at least the process for forming the inclined portion on the lens material body, the process for forming the convex portion on the objective side of the lens material body and the process for processing the objective surface of the convex portion, when the inclined portion is formed by the machine process and the convex portion is formed by a suitable method such as the semiconductor process technology, the objective surface can be formed as the very small area as compared with the related art and hence the process time and process volume of this objective surface can be decreased.

Therefore, according to the solid immersion lens forming method of the present invention, it becomes possible to easily obtain the condensing lens in which the tilt margin between the objective surface and the optical recording medium can be increased and which has the large numerical aperture.

Further, in the solid immersion lens forming method of the present invention, when the convex portion of the solid immersion lens is processed as the shape which can satisfy the above-described equations (1) to (3), as described above, it is possible to form the solid immersion lens in which the tilt margin between the objective surface and the optical recording medium can be increased as compared with the related-art solid immersion lens and which can obtain the maximum numerical aperture.

Also, in the solid immersion lens forming method of the present invention, when the tip end portion of the convex portion is formed as the shape which substantially circumscribes the sphere with the diameter of approximately r if the spherical portion is the hemispherical portion or when it is formed as the shape which substantially circumscribes the sphere with the radius of approximately r/n if the spherical portion is the hyper-hemispherical portion, it is possible to form the solid immersion lens in which the tilt margin between it and the object such as the optical recording medium can be increased and in which the assembly accuracy margin with other optical lens can be increased.

Further, in the above-mentioned solid immersion lens forming method, when the tip end portion of the solid immersion lens is processed as the shape which can satisfy the above-described equations (1) to (3) and it is also processed as the shape which substantially circumscribes the sphere with the diameter of approximately r if the spherical portion is the hemispherical portion or it is also processed as the shape which substantially circumscribes the sphere with the radius of approximately if the spherical portion is the hyper-hemispherical portion, it is possible to easily form the solid immersion lens with the large numerical aperture in which the tilt margin between it and the object such as the optical recording medium can be increased and in which the assembly accuracy margin with other optical lens can be increased.

Furthermore, in the above-mentioned respective solid immersion lens forming methods, when the tip end portion of the convex portion is processed by the focus ion beam process method, it is possible to form the objective lens with the extremely small area reliably with high accuracy as compared with the related art.

It should be understood by those skilled in the art that various modifications, combinations, sub-combinations and alterations may occur depending on design requirements and other factors insofar as they are within the scope of the appended claims or the equivalents thereof.

What is claimed is:

1. A solid immersion lens, comprising:
an inclined portion formed on at least a part of a tip end portion of the objective side, and having a convex portion formed on its tip end portion so as to protrude toward the objective side, wherein an inclination angle $\theta$ from the optical axis of said inclined portion is expressed as:

$\theta \geqq \theta i$ where $\theta i$ represents an angle of incidence of incident light; and said convex portion is shaped so as to satisfy the following relationships expressed as:

$\tan^{-1}(h/y) < 90° - \theta i$ $\tan^{-1}((d+h)/z)) \geqq 0.10°$ $\tan^{-1}(d/y) \geqq 0.10°$ where h represents the height protruding toward the objective side, y represents the length from said optical axis to the edge portion of said convex-like portion, z represents the length from said optical axis to the edge portion of the objective side of said inclined portion and d represents a space between said solid immersion lens and the objective.

2. A solid immersion lens according to claim 1, wherein said solid immersion lens has a spherical portion shaped like a hemisphere on the opposite side of the objective side and the tip end face of said convex portion is shaped so as to approximately circumscribe a sphere having a diameter of nearly r where r represents the radius of curvature of said spherical portion.

3. A solid immersion lens according to claim 1, wherein said solid immersion lens has a spherical portion shaped like a hemisphere on the opposite side of the objective side and the tip end face of said convex portion is shaped so as to approximately circumscribe a sphere having a diameter of nearly r where r represents the radius of curvature of said spherical portion.

4. A solid immersion lens according to claim 1, wherein said solid immersion lens has a spherical portion shaped like a hemisphere on the opposite side of the objective side and the tip end face of said convex portion is shaped so as to approximately circumscribe a sphere having a diameter of nearly r where r represents the radius of curvature of said spherical portion.

5. A solid immersion lens according to claim 1, wherein said solid immersion lens has a spherical portion shaped like a hyper-hemisphere on the opposite side of the objective side and the tip end face of said tip end portion is shaped so as to approximately circumscribe a sphere having a radius of nearly r/n where r represents the radius of curvature of said spherical portion and n represents the refractive index.

6. A solid immersion lens according to claim 1, wherein said solid immersion lens has a spherical portion shaped like a hyper-hemisphere on the opposite side of the objective side and the tip end face of said tip end portion is shaped so as to approximately circumscribe a sphere having a radius of nearly r/n where r represents the radius of curvature of said spherical portion and n represents the refractive index.

7. A solid immersion lens according to claim 1, wherein said solid immersion lens has a spherical portion shaped like a hyper-hemisphere on the opposite side of the objective side and the tip end face of said tip end portion is shaped so as to approximately circumscribe a sphere having a radius of nearly r/n where r represents the radius of curvature of said spherical portion and n represents the refractive index.

8. A condensing lens, comprising:
a solid immersion lens; and
an optical lens with its optical axis coincident with that of said solid immersion lens and which is located on the opposite of an objective side, wherein said solid immersion lens has an inclined portion formed on at least a part of a tip end portion of its objective side and an inclination angle $\theta$ from the optical axis of said inclined portion is expressed as:

$\theta \geqq \theta i$ where θi represents the angle of incidence of light incident on said solid immersion lens; and said inclined portion has a convex portion formed on its tip end portion so as to protrude toward the objective side, and said convex portion is shaped so as to satisfy the following relationships expressed as:

$\tan^{-1}(h/y) < 90° - \theta i$ $\tan^{-1}((d+h)/z)) \geq 0.10°$ $\tan^{-1}(d/y) \geq 0.10°$ where h represents the height protruding toward the objective side, y represents the length from said optical axis to the edge portion of said convex-like portion, z represents the length from said optical axis to the edge portion of the objective side of said inclined portion and d represents a space between said solid immersion lens and the objective.

9. A condensing lens according to claim 8, wherein said inclined portion of said solid immersion lens has a convex portion formed on its tip end portion so as protrude toward the objective side.

10. An optical pickup device, comprising:
at least a solid immersion lens;
an optical lens with its optical axis coincident with that of said solid immersion lens and which is located on the opposite side of the objective side;
a light source; and
a condensing lens composed of said solid immersion lens and said optical lens, said condensing lens converging light emitted from said light source to form a light spot, wherein said solid immersion lens has an inclined portion formed at least on a part of a tip end portion of the objective side and an inclination angle θ from the optical axis of said inclined portion is expressed as:

$\theta \geq \theta i$ where θi represents the angle of incidence of light incident on said solid immersion lens, and said inclined portion has a convex portion formed on its tip end portion so as to protrude toward the objective side, and said convex portion is shaped so as to satisfy the following relationships expressed as:

$\tan^{-1}(h/y) < 90° - \theta i$ $\tan^{-1}((d+h)/z)) \geq 0.10°$ $\tan^{-1}(d/y) \geq 0.10°$ where h represents the height protruding toward the objective side, y represents the length from said optical axis to the edge portion of said convex-like portion, z represents the length from said optical axis to the edge portion of the objective side of said inclined portion and d represents a space between said solid immersion lens and the objective.

11. An optical pickup device according to claim 10, wherein said inclined portion of said solid immersion lens has a convex portion formed at its tip end portion so as to protrude toward the objective side.

12. An optical recording and reproducing apparatus, comprising:
an optical pickup device including at least a solid immersion lens, an optical lens with its optical axis coincident with that of said solid immersion lens and which is located on the opposite side of the objective side and a condensing lens composed of said solid immersion lens and said optical lens, said condensing lens converging light emitted from said light source to form a light spot; and control drive means for moving said condensing lens in the focusing direction and/or tracking direction of an optical recording medium, wherein said solid immersion lens has an inclined portion formed at least on a part of its tip end portion of the objective side and an inclination angle θ from the optical axis of said inclined portion is expressed as:

$\theta \geq \theta i$ where θi represents the angle of incidence of light incident on said solid immersion lens, and said inclined portion has a convex portion formed on its tip end portion so as to protrude toward the objective side, and said convex portion is shaped so as to satisfy the following relationships expressed as:

$\tan^{-1}(h/y) < 90° - \theta i$ $\tan^{-1}((d+h)/z)) \geq 0.10°$ $\tan^{-1}(d/y) \geq 0.10°$ where h represents the height protruding toward the objective side, y represents the length from said optical axis to the edge portion of said convex-like portion, z represents the length from said optical axis to the edge portion of the objective side of said inclined portion and d represents a space between said solid immersion lens and the objective.

13. An optical recording and reproducing apparatus according to claim 12, wherein said inclined portion of said solid immersion lens has a convex portion formed at its tip end portion so as to protrude toward the objective side.

14. A method for forming a solid immersion lens, comprising:
at least a process for forming an inclined portion on a lens material;
a process for forming a convex portion on the objective side of said lens material; and
a process for forming an objective surface of said convex portion, and
wherein said convex portion is processed like a shape which can satisfy the following relationships expressed as:

$\tan^{-1}(h/y) < 90° - \theta i$ $\tan^{-1}((d+h)/z)) \geq 0.10°$ $\tan^{-1}(d/y) \geq 0.10°$ where h represents the height protruding toward the objective side, y represents the length from said optical axis to the edge portion of said convex-like portion, z represents the length from said optical axis to the edge portion of the objective side of said inclined portion and d represents a space between said solid immersion lens and the objective.

15. A method for forming a solid immersion lens according to claim 14, wherein said solid immersion lens has a spherical portion shaped as a hemispherical portion on the opposite side of the objective side and said convex portion has a tip end face processed as a shape which nearly circumscribes a sphere having a diameter of nearly r where r represents the radius of curvature of said spherical portion.

16. A method for forming a solid immersion lens according to claim 14, wherein said solid immersion lens has a spherical portion shaped as a hemispherical portion on the opposite side of the objective side and said convex portion has a tip end face processed as a shape which nearly circumscribes a sphere having a diameter of nearly r where r represents the radius of curvature of said spherical portion.

17. A method for forming a solid immersion lens according to claim 14, wherein said solid immersion lens has a spherical portion shaped as a hyper-sphere on the opposite side of the objective side and said convex portion has a tip end portion processed as a shape which nearly circumscribes a sphere having a radius of nearly r/n where r represents the radius of curvature of said spherical portion and n represents the refractive index.

18. A method for forming a solid immersion lens according to claim 14, wherein said solid immersion lens has a spherical portion shaped as a hyper-sphere on the opposite side of the objective side and said convex portion has a tip end portion processed as a shape which nearly circumscribes a sphere having a radius of nearly r/n where r represents the radius of curvature of said spherical portion and n represents the refractive index.

19. A method for forming a solid immersion lens according to claim 14, wherein said tip end portion of said convex portion is processed by a focus ion beam processing method.

20. A method for forming a solid immersion lens according to claim 14, wherein said tip end portion of said convex portion is processed by a focus ion beam processing method.

21. A method for forming a solid immersion lens according to claim 15, wherein said tip end portion of said convex portion is processed by a focus ion beam processing method.

22. A method for forming a solid immersion lens according to claim 16, wherein said tip end portion of said convex portion is processed by a focus ion beam processing method.

23. A method for forming a solid immersion lens according to claim 17, wherein said tip end portion of said convex portion is processed by a focus ion beam processing method.

24. A method for forming a solid immersion lens according to claim 18, wherein said tip end portion of said convex portion is processed by a focus ion beam processing method.

* * * * *